US007429059B2

(12) United States Patent
Miyata

(10) Patent No.: US 7,429,059 B2
(45) Date of Patent: Sep. 30, 2008

(54) AIRBAG APPARATUS AND MOTORCYCLE PROVIDED WITH AIRBAG APPARATUS

(75) Inventor: Yasuhito Miyata, Minato-ku (JP)

(73) Assignee: Takata Corporation, Tokyo (JP)

( * ) Notice: Subject to any disclaimer, the term of this patent is extended or adjusted under 35 U.S.C. 154(b) by 149 days.

(21) Appl. No.: 11/582,235

(22) Filed: Oct. 17, 2006

(65) Prior Publication Data
US 2007/0085306 A1 Apr. 19, 2007

(30) Foreign Application Priority Data
Oct. 17, 2005 (JP) ............................. 2005-302375

(51) Int. Cl.
B60R 21/16 (2006.01)
B60R 21/20 (2006.01)
B60R 21/26 (2006.01)
(52) U.S. Cl. ................. 280/730.1; 280/728.2; 280/735; 280/741
(58) Field of Classification Search ............. 280/728.2, 280/730.1, 730.2, 731, 732, 735, 741
See application file for complete search history.

(56) References Cited

U.S. PATENT DOCUMENTS

| 6,007,090 | A | * | 12/1999 | Hosono et al. | ............ | 280/730.2 |
| 6,106,000 | A | * | 8/2000 | Stewart | ............ | 280/728.2 |
| 6,106,010 | A | * | 8/2000 | Forbes et al. | ............ | 280/741 |
| 6,439,604 | B1 | * | 8/2002 | Al-Amin et al. | ............ | 280/736 |
| 6,669,226 | B2 | * | 12/2003 | Fowler et al. | ............ | 280/728.2 |
| 6,854,762 | B2 | * | 2/2005 | Yanagibashi et al. | ........ | 280/736 |
| 6,932,379 | B2 | | 8/2005 | Yamazaki et al. | | |
| 6,991,254 | B2 | | 1/2006 | Yanagibashi et al. | | |
| 7,293,793 | B2 | * | 11/2007 | Miyata | .................... | 280/730.1 |
| 2005/0116446 | A1 | * | 6/2005 | Mabuchi et al. | .......... | 280/728.2 |

FOREIGN PATENT DOCUMENTS

| DE | 10317927 | 11/2003 |
| EP | 1338479 | 8/2003 |
| JP | 11-91485 A | 4/1999 |
| JP | 2000-85518 A | 3/2000 |
| JP | 2002-137777 | 5/2002 |
| JP | 2002137777 | 5/2002 |

OTHER PUBLICATIONS

European Search Report dated Oct. 30, 2007 relating to corresponding European Patent Application No. 06021023.4-2425.

* cited by examiner

Primary Examiner—Toan C To
(74) Attorney, Agent, or Firm—Fitch, Even, Tabin & Flannery

(57) ABSTRACT

An technique is provided for suppressing external force received by a connector from a housing body side, in an airbag apparatus for use in a motorcycle, which has a construction housing an inflator for generating gas for expanding an airbag at a gas-generating section, and a connector for connecting a harness for supplying electric current to an igniting section of the inflator in the housing body. In one form, an airbag apparatus mounted on a two-wheeled motor vehicle is constructed to prevent the retainer wall portion from directly interfering with a connector by intervening a vertical extending portion of a lower holder that holds a lower portion of an inflator at a space between the retainer wall portion and the connector.

19 Claims, 15 Drawing Sheets

AIRBAG APPARATUS AND MOTORCYCLE PROVIDED WITH AIRBAG APPARATUS

FIELD OF THE INVENTION

The present invention relates to a technology for constructing an airbag apparatus mounted on a motorcycle.

BACKGROUND OF THE INVENTION

Hitherto, various technologies aiming at restraining a rider by means of mounting an airbag apparatus on a motorcycle is known. For example, a technology in which when a forward collision occurs in a two-wheeled motor vehicle, an airbag is expanded and developed by means of supplied gas for expanding the airbag, which is generated by an inflator, and the rider is thereby restrained is known (for example, refer to Japanese Unexamined Patent Application Publication No. 2002-137777). The airbag apparatus described in the Japanese Unexamined Patent Application Publication No. 2002-137777 is constructed such that an airbag previously folded back is housed in a housing body and an airbag opening of the housing body is covered with an airbag cover. Further, the airbag cover is configured such that the same is caused to cleave at a thin walled portion along an expanding and developing motion of the airbag, and is allowed to perform the expanding and developing motion of the airbag directed from an internal part of the housing body to an external part thereof by means of opening the airbag opening.

Incidentally, in the airbag apparatus such as that described in the aforementioned Japanese Unexamined Patent Application Publication No. 2002-137777, a construction, in which an igniting section is caused to be ignited by an electric current being supplied thereto via a harness and propellant filled in a gas-generating section is ignited and the gas for expanding the airbag is thereby generated, is used as a concrete construction of the inflator. In such a construction, it is assumed that a connector for connecting the harness to the igniting section of the inflator receives external force by means of being interfered with the housing body, at a time of assembling work for housing the inflator into the housing body, or in a condition for the inflator to be housed in the housing body, or the like. Specifically, size of the inflator is increased along with a demand for large-sizing of an airbag in motorcycles. On the other hand, when the housing body is compact-sized so that the airbag apparatus is small-sized, a space between the housing body and the inflator housed in the housing body is brought to be narrow, and a possibility for the housing body to be interfered with the connector is thereby increased. As a result, a problem in which the connector tends to receive external force occurs.

SUMMARY OF THE INVENTION

Consequently, the present invention is made in light of the above-described problem, and in the airbag apparatus for use in a motorcycle having a construction, in which the inflator that generates gas for expanding the airbag in the gas-generating section, and the connector for connecting the harness for supplying the electric current to the igniting section of the inflator are housed in the housing body, the object is to provide an effective technology for suppressing the external force received by the connector from the housing body side.

To achieve the aforementioned object, inventions described in each of the forms are constructed. The inventions described in these respective embodiments are typically applicable to a construction of an airbag apparatus mounted on various kinds of motorcycles. Incidentally, in the present specification, "motorcycle" as a typical example of a motor vehicle widely includes a saddle-riding motor vehicle, i.e., a type of the motor vehicle in which a rider is seated with straddling on a seat, and, for example, the "motorcycle" includes both a touring-type two-wheeled motor vehicle in which a fuel tank is provided in parallel in a front side of the rider's seat, and a scooter-type two-wheeled motor vehicle where an interspace is formed between a rider's seat and a head pipe for supporting a handle. In addition, the aforementioned "motorcycle" further widely includes a motorcycle in which a rider is seated with straddling on a seat, while having three or more wheels (for example, a three-wheeled motorcycle for use in a door-to-door delivery or the like, a motorcycle of three-wheeled buggy, or four-wheeled buggy for running a whole distance of rough road). In addition, a motorcycle such as a snow mobile or the like, in which a rider is seated with straddling on a seat, while running by a sleigh or a caterpillar belt is also included in the aforementioned "motorcycle" other than the two-wheeled motor vehicle.

The first form of the present invention to solve the aforementioned problems is an airbag apparatus to be mounted on a motorcycle and is at least provided with an inflator, a connector, an airbag, and an interference-avoiding device.

The inflator of the present invention is constructed as a device for generating gas for expanding the airbag at a gas-generating section by supplying electric current to an igniting section. Supplying operation of the electric current to the igniting section is performed by a detecting sensor of a vehicle body side when the detecting sensor detects a forward collision of the motorcycle. When the igniting section is ignited by the supplying operation of the electric current, propellant filled in the gas-generating section is ignited and the gas for expanding the airbag is generated.

The airbag according to the present invention is constructed as an airbag for restraining a rider, while the same is expanded and developed to a rider-restraining area at a front side of the rider by supplying operation of the gas for expanding the airbag, which is generated in the gas-generating section of the inflator, when the motorcycle is in the forward collision. In the "forward collision" described at this moment widely includes a condition, in which the motorcycle collides with a colliding object, such as, for example, another motor vehicle, a pedestrian, a hurdle, or the like, in a running condition or a static condition at the front side thereof. Further, in "rider-restraining area" described here is defined as a space for restraining the rider that is about to be given a fling toward a front side of the motorcycle vehicle, existing on an extension line in a frontward moving direction of the rider, when the rider is about to move toward the front side of the motorcycle vehicle by energy of movement caused at a time of the forward collision.

The connector according to the present invention is constructed as a connector for connecting a harness for supplying the electric current to the igniting section of the inflator. The electric current supplied from the harness is enabled to be supplied to the igniting section of the inflator by connecting the connector.

The housing body of the present invention has a construction that at least houses the inflator and the connector. The housing body is typically constructed by using a box-shaped retainer having a bottom. At this moment, in such a construction, the connector is assumed to receive external force by being interfered with the housing body at a time of assembling work for housing the inflator into the housing body, or in a condition for the inflator to be housed in the housing body, or the like. Specifically, size of the inflator is increased along with a demand for large-sizing of an airbag in motorcycles. On the other hand, when the housing body is compact-sized so that the airbag apparatus is small-sized, a space between the housing body and the inflator housed in the housing body is brought to be narrow, and a possibility for the housing body to be interfered with the connector is thereby increased. As a result, the connector tends to receive external force.

Consequently, the present invention adopts a construction in which the interference-avoiding device is provided in the airbag apparatus. The interference-avoiding device is intervened at an area between an opposing portion facing the connector in each portion of the housing body, and the connector, and is constructed as a device for avoiding the opposing portion and the connector interfering with each other. With respect to the words "avoiding of the interference" described here widely includes aspects in which direct contact between an opposing portion of the housing body and the connector is avoided. Further, various aspects, such as that a movement itself of the opposing portion of the housing body and the connector approaching each other is limited, or that a mutual contact between the opposing portion of the housing body and the connector is avoided, while the movement of the opposing portion of the housing body and the connector approaching each other is allowed, or the like, can be adopted. At this moment, the construction may be formed such that the external force applied from the opposing portion of the housing body to the connector is perfectly blocked, or that the external force is applied to the connector in a condition of being reduced. Further, the word "intervene" includes an aspect in which the interference-avoiding device is joined at the opposing portion, an aspect in which the interference-avoiding device is joined at the connector, or the like, other than an aspect in which the interference-avoiding device is disposed in the space between the opposing portion of the housing body and the connector.

With respect to the concrete construction of the interference-avoiding device of the present invention, the first construction in which the external force applied to the connector is perfectly blocked by causing a rigid member, such as metal or the like to be intervened in the area between the housing body and the connector, the second construction in which reduced external force is applied from the opposing portion of the housing body to the connector by causing cushioning material (elastic material), such as resin, rubber, or the like to be intervened in the area between the opposing portion of the housing body and the connector, or the like can be appropriately adopted.

According to such a construction of the airbag apparatus described in the first form of the invention, the external force in which the connector connecting the harness for supplying the electric current to the igniting section of the inflator receives from the housing body side can be suppressed by the interference-avoiding device.

The second form of the present invention for solving the aforementioned problems is an airbag apparatus further provided with an inflator holder in the construction described in the first form of the invention. The inflator holder has a function to integrally hold an inflator in a housing body. In addition, in the inflator holder, an extending portion as an interference-avoiding device that is extended in an area between an opposing portion of the housing body and a connector, from a holder main body. In other words, in the present invention, the extending portion to serve as the interference-avoiding device is formed using the inflator holder provided so as to integrally hold the inflator in the housing body. Since a direct interference of the opposing portion of the housing body and the connector is avoided by the extending portion intervening in the area between the opposing portion of the housing body and the connector, the external force from the opposing portion of the housing body is blocked to be applied to the connector, or reduced external force from the opposing portion of the housing body is applied to the connector.

According to such a construction of the airbag apparatus describe in the second form of the invention, an interference-avoiding device intervened in the area between the opposing portion of the housing body and the connector can be easily and rationally constructed.

The third form of the present invention for solving the aforementioned problems is an airbag apparatus wherein the housing body described in the first or second form has a construction in which the airbag is housed in an upper area of the inflator in a predetermined folding back condition. In addition, the extending portion of the inflator holder is constructed such that the connector is prevented from receiving a downward-looking load from the airbag along with housing operation for the airbag. At a time of housing operation for the airbag, operation for folding back the airbag in a predetermined condition, or operation for pressing the airbag into an internal part of the housing body is performed, and a case, in which a downward-looking load is applied to the inflator by the operation, is assumed. Consequently, in the present invention, even in such a case described above, a construction, in which the connector is prevented from receiving the downward-looking load from the airbag by the extending portion of the inflator holder, is adopted. As an example, an intervening portion being intervened above an installing height of the connector is provided at the extending portion of the inflator holder, and the intervening portion is constructed to have strength capable of opposing the downward-looking load from the airbag. That is, a construction is provided in which a deformation of the intervening portion due to the downward-looking load from the airbag is suppressed. According to such a construction, at a time of housing operation for the airbag, the load can be prevented from being applied to the connector by receiving the downward-looking load from the airbag, by the intervening portion.

According to such a construction of the airbag apparatus described in the third form of the invention, since the extending portion of the inflator holder used as an interference-avoiding device can be also used as a device for preventing the connector from receiving the downward-looking load from the airbag further, a more rational structure is realized.

The fourth form of the present invention for solving the aforementioned problems is the airbag apparatus wherein the inflator described in the first, second, or third form has a construction in which the inflator and the connector are attached and fixed to an internal part of the housing body in a condition of being housed in an airbag. Thus, in the construction in which the inflator and the connector are housed in the airbag, it is not possible to check with eyes whether external force is actually applied to the connector from the opposing portion of the housing body. Consequently, in the present invention, specifically, in the construction in which the inflator and the connector are housed in the airbag, an interference-avoiding device for avoiding the opposing portion of the housing body and the connector to interfere with each other is previously provided.

According to the airbag apparatus described in the fourth form of the invention, in the construction in which whether the external force is actually applied to the connector from the opposing portion or the like of the housing body cannot be checked with eyes because of being blocked out by the airbag, it is particularly effective to aim at securely protecting the connector without giving anxious thought to the worker who attaches and fixes the inflator.

The fifth form of the present invention for solving the aforementioned problems is a motorcycle on which the airbag apparatus according to any one of the first, second, third, or fourth forms of the invention is mounted.

Therefore, in accordance with the invention described in the fifth form of the invention, a motorcycle on which an airbag apparatus capable of suppressing external force from a housing body side, received by a connector for connecting a harness for supplying electric current to an igniting section of the inflator by an interference-avoiding device is mounted is provided.

As described above, according to the present invention, in an airbag apparatus for use in a motorcycle having a construction in which an inflator that generates gas for expanding an airbag in a gas-generating section, and a connector that connects a harness for supplying electric current to an igniting section of the inflator are housed in a housing body, it becomes possible to suppress external force received by the connector from the housing body side by interference-avoiding device.

DETAILED DESCRIPTION OF THE PREFERRED EMBODIMENTS

Figure 1:
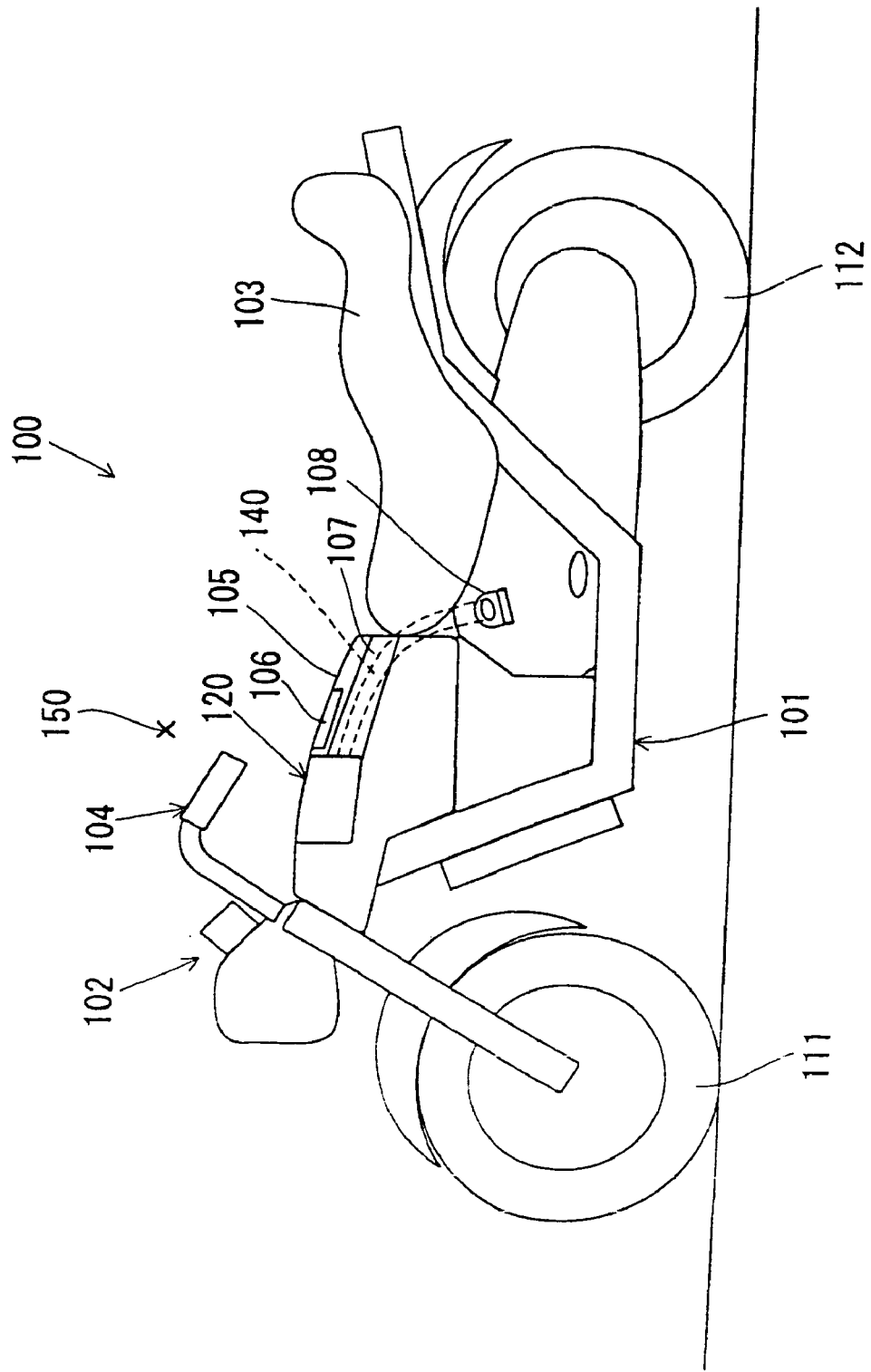
FIG. 1 is a view of a two-wheeled motor vehicle 100 according to an embodiment of a "motorcycle" with respect to the present invention, looking from a side, showing a condition in which the airbag apparatus 120 is mounted on the two-wheeled motor vehicle 100.
Figure 2:
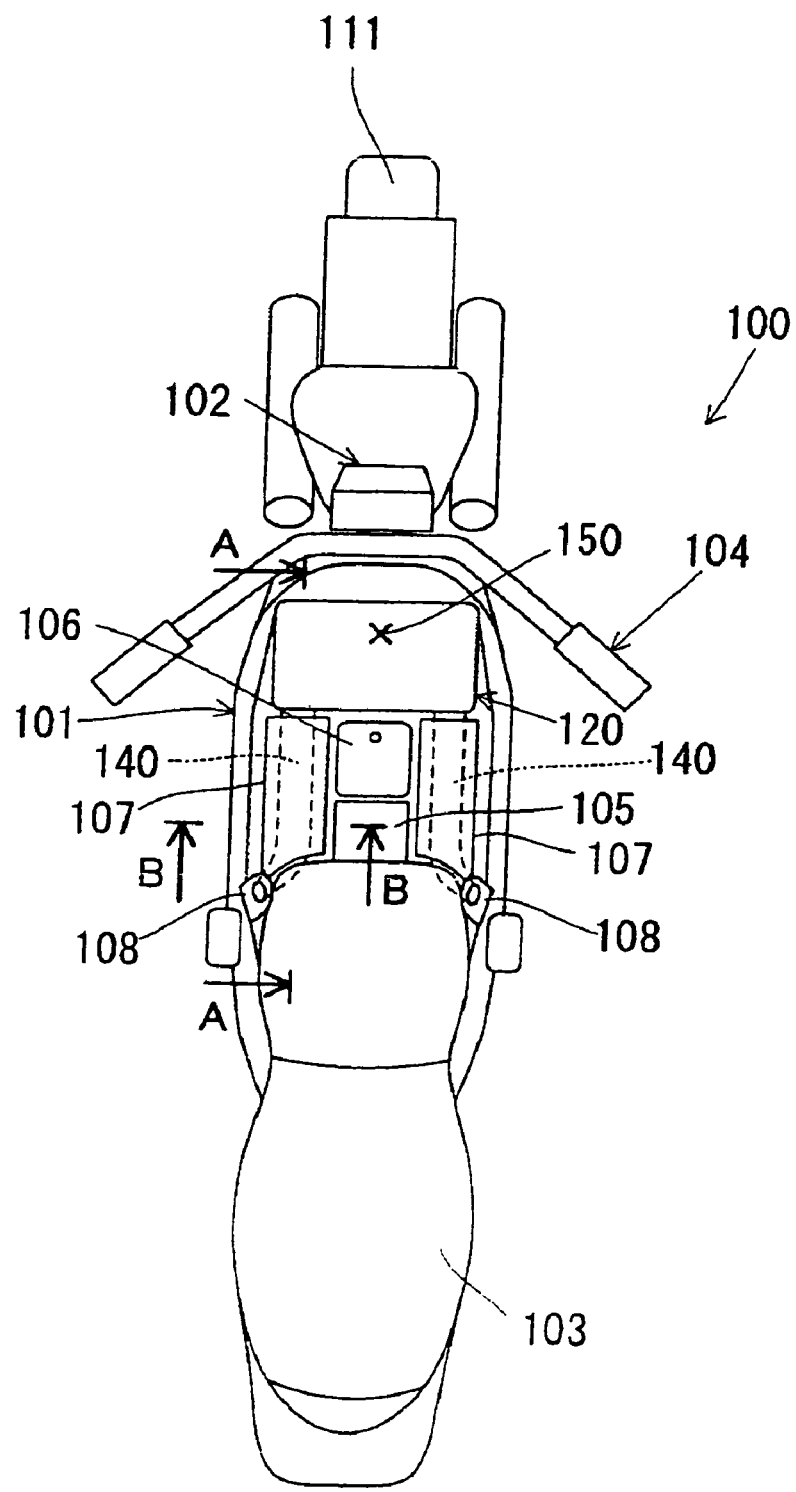
FIG. 2 is a view showing a condition of the two-wheeled motor vehicle 100 of FIG. 1, looking from above the motor vehicle.

Hereinbelow, the embodiment of the present invention will be explained in detail with reference to the drawings. Firstly, an entire construction of a two-wheeled motor vehicle 100 will be explained with reference to FIGS. 1 and 2. At this moment, FIG. 1 is a view of the two-wheeled motor vehicle 100 according to an embodiment of the "motorcycle" with respect to the present invention, looking from a side, and is a view showing a condition in which an airbag apparatus 120 is mounted on a motor vehicle of the two-wheeled motor vehicle 100. FIG. 2 is a view showing a condition of the two-wheeled motor vehicle 100 in FIG. 1, looking from above the motor vehicle. Incidentally, the two-wheeled motor vehicle 100 of the present embodiment corresponds to an example of a "motorcycle" or a "motorcycle vehicle" according to the present invention.

As shown in FIGS. 1 and 2, the two-wheeled motor vehicle 100 is constructed as a so-called touring-type motor cycle composed of a vehicle body constituting portion 101 constituted by an engine, a main frame, and the like, a seat 103 on which a rider can be seated with straddling thereupon, a handle 104, a front wheel 111, a rear wheel 112, and the like as main components.

An area located above the vehicle body constituting portion 101 of the two-wheeled motor vehicle 100, and located at a front side of the rider seated on the seat 103 is defined as a rider-restraining area 150 at a time when the two-wheeled motor vehicle 100 causes a forward collision. The "forward collision" in the present embodiment widely includes conditions in which the two-wheeled motor vehicle 100 collides with various objects at a front side thereof to be collided (for convenience, though not particularly shown, for example, a motor vehicle, a pedestrian, a hurdle, a guard rail, or the like object to be collided). In addition, the "rider-restraining area 150" in the present embodiment is an area that corresponds to the "rider-restraining area" according to the present invention and is defined as a space for restraining the rider that is about to be given a fling toward a front side of the motorcycle, existing on an extension line in a frontward moving direction of the rider, when the rider seated on the seat 103 is about to move toward a front side of the motor vehicle by energy of movement caused at a time of the forward collision.

A head light, each kind of meters, switches, windshield, or the like is provided in a front portion 102 at the front side of the motor vehicle in the vehicle body constituting portion 101. At an area between the front portion 102 and the seat 103, a fuel tank 106 is provided in front of a vehicle body constituting member 105, and the airbag apparatus (sometimes called "airbag module") 120 is disposed nearer the front side from the fuel tank 106. Further, webbing covers, 107 and 107, that cover a pair of left and right webbings, 140 and 140, serving as one of constituting members of the airbag apparatus 120 are disposed at both sides of the fuel tank 106. In a normal condition when the airbag apparatus 120 is not operated, the pair of webbings, 140 and 140, are configured not to be seen or to be hard to be seen from outside, by covering function of the webbing covers, 107 and 107. Details of the pair of webbings, 140 and 140, will be described later in the explanation for the construction of the airbag apparatus 120.

At this moment, the construction of the airbag apparatus 120 of the present embodiment will be explained in detail referring to FIGS. 3 through 14. Incidentally, the airbag apparatus 120 is disposed in a manner so as to face the rider-restraining area 150 for the rider seated on the seat 103. The airbag apparatus 120 corresponds to the "airbag apparatus" according to the present invention.

Figure 3:
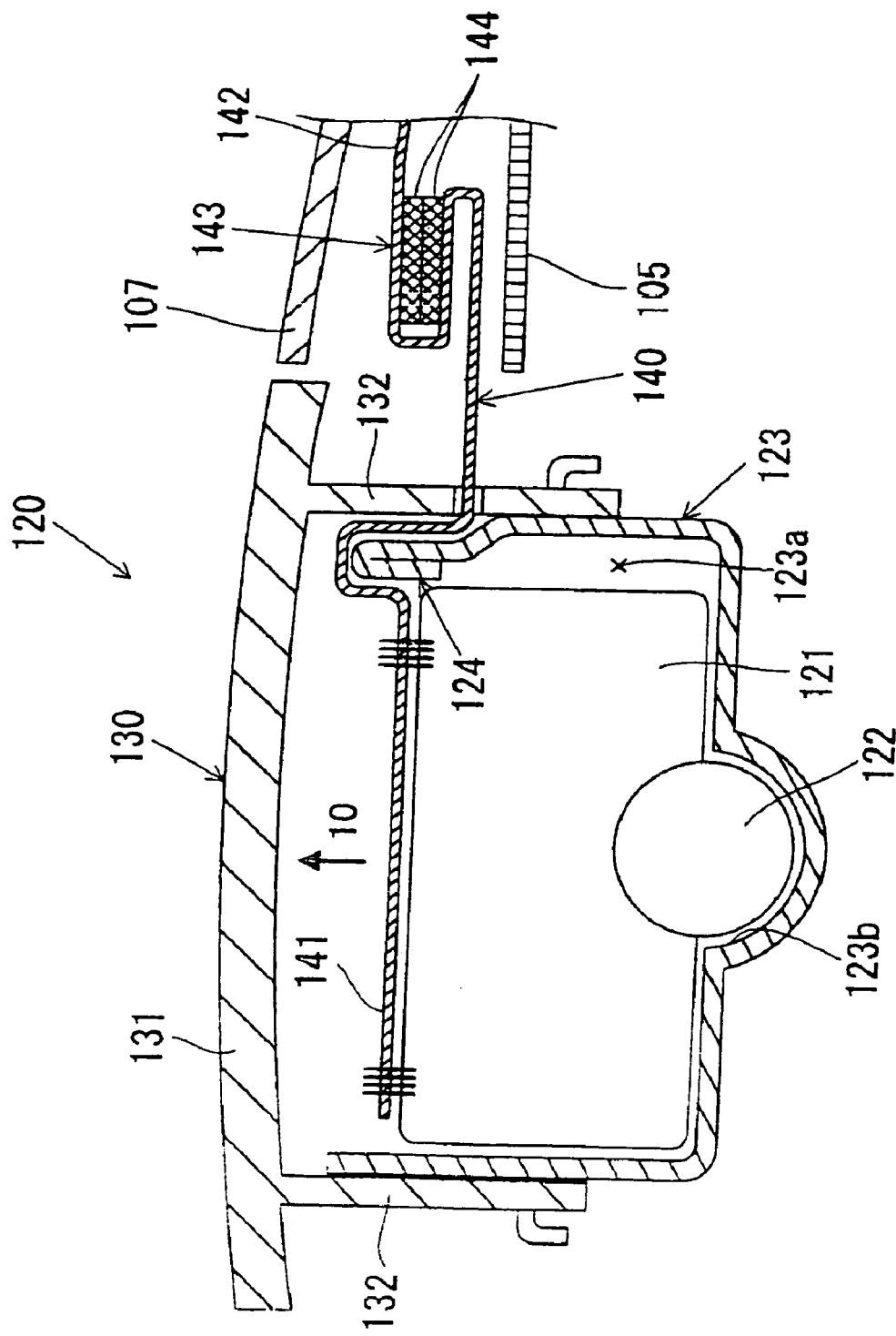
FIG. 3 is a view showing a cross-section structure along A-A line in the two-wheeled motor vehicle 100 of FIG. 2.
Figure 4:
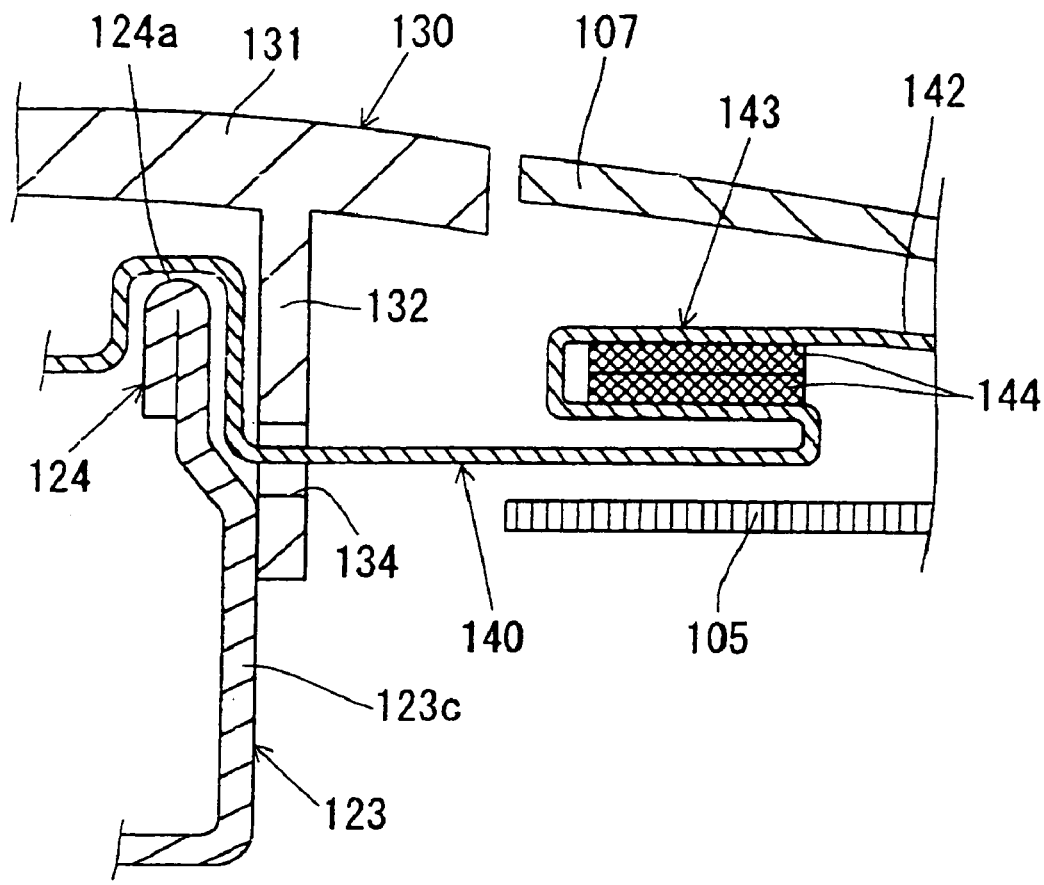
FIG. 4 is a partially enlarged view of FIG. 3.
Figure 5:
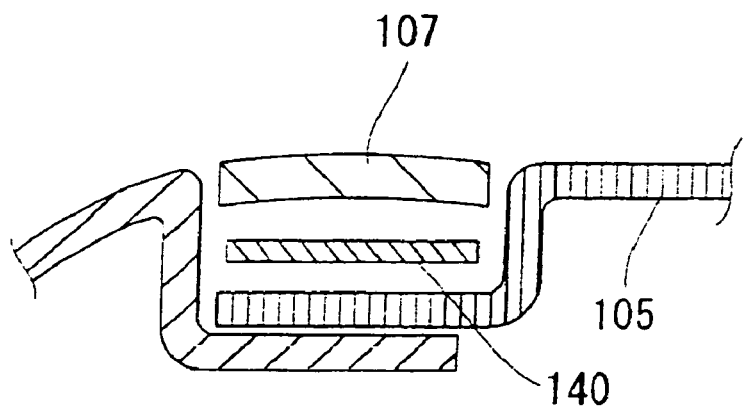
FIG. 5 is a view showing a cross-section structure along B-B line in the two-wheeled motor vehicle 100 of FIG. 2.

A cross-section structure at A-A line of the two-wheeled motor vehicle 100 in FIG. 2 is shown in FIG. 3, and a partially enlarged view of FIG. 3 is shown in FIG. 4. Further, a cross-section structure at B-B line of the two-wheeled motor vehicle 100 in FIG. 2 is shown in FIG. 5. As shown in FIGS. 3 and 4, the airbag apparatus 120 is constituted by an airbag 121, a gas-generating device 122, a retainer 123, a module cover 130, and the pair of webbings, 140 and 140, as main components.

As shown in FIGS. 3 and 4, the airbag 121 is constructed as an airbag that is housed in the retainer 123 in a condition of being previously folded back in a predetermined folding back condition (such as a bellows folding, a roll folding, or the like). In FIG. 3, a protruding (developing) direction of the airbag 121 is indicated by an arrow 10. The airbag 121 is constructed by the same material as that of an airbag cloth for use in an automobile. The airbag 121 corresponds to the "airbag" according to the present invention.

Further, the gas-generating device 122 is constructed as a gas-supplying device for supplying gas for expanding an airbag to an internal part of the airbag 121, so that the airbag 121 in a folding back condition is expanded while developing from the retainer 123 at a time of a motor vehicle collision.

Furthermore, the retainer 123 is constructed as a box-shaped case body having a bottom, at least including an airbag housing portion 123a that houses the airbag 121, and an inflator housing portion (concave portion) 123b that houses a gas-generating device 122. The retainer 123 houses the airbag 121 and includes an opening portion ("airbag opening" in the present invention) that allows expansion and development of the airbag 121, at an upper part thereof. The retainer 123 is typically molded by performing a press work for metal material. The retainer 123 corresponds to a "housing body" according to the present invention.

Incidentally, in the present embodiment, since each of the webbings, 140 and 140, described later, is configured to be extended over an area from an internal part of the retainer 123 to an external part thereof, there is a possibility that partial abrasion on the webbing 140 occurs by contacting with the retainer 123 at a time when the motor vehicle vibrates while running, at a time when each of the webbings, 140 and 140, is pulled out from the housing body for the maintenance, at a time when the webbing 140 changes the condition thereof from a loose condition to a stretched condition along with expanding and developing motion of the airbag 121, or the like. Consequently, in the present embodiment, in each of the portions of a retainer wall portion 123c of the retainer 123, a folding-back portion 124 is formed at a portion where each of the webbings, 140 and 140, has a possibility to be in contact with the same. The folding-back portion 124 is provided with a smooth surface (a smooth surface 124a in FIG. 4) at an upper end portion of a metal plate piece of the retainer 123. The smooth surface 124a is formed by performing the turning back work (folding back work) for the upper end portion (plate-shaped end portion) of the retainer 123. The smooth surface 124a is an arc-shaped smooth surface (arc surface) corresponding to part of a circle or part of an ellipse. The smooth surface 124a has a function to allow a smooth sliding movement between a portion of the retainer 123 to be in contact with the webbing 140, and each of the webbings, 140 and 140, by forming the shape as described above, while suppressing the sliding resistance thereof.

In concrete terms, the smooth surface 124a is constructed to be a smooth surface shape that allows the movement of the webbing 140, while keeping a surface contact between the webbing 140 and the smooth surface 124a in a moving direction of the webbing 140, when moving along with the vibration of the motor vehicle, the pulling-out operation for the webbing 140 at a time of maintenance, the expanding and developing motion of the airbag 121, or the like. At this moment, at a contact area between the webbing 140 and the smooth surface 124a, a curvature of the webbing 140 and that of the smooth surface 124a are brought to be approximately equal. In other words, the smooth surface 124a is constructed to be a device for guiding the curvature of the webbing 140 to be aligned with that of the smooth surface 124a, while keeping the surface contact therebetween, when the webbing 140 moves relative to the retainer 123.

According to such a construction described above, each of the webbings, 140 and 140, made of, for example, fiber material is enabled to be prevented from being abraded due to being in contact with the retainer 123 made of metallic material, via the smooth surface 124a of the folding-back portion 124. In addition, in the present embodiment, since the retainer 123 itself, which serves as a portion to be in contact with each of the webbings, 140 and 140, is constructed to have the smooth surface 124a, a structure relevant to a smoothing device is simplified and the number of the parts can be suppressed. Further, preferably, it is effective to use a construction in which a surface square measure of the smooth surface 124a at the folding-back portion 124 is increased, and concentrated friction force at a local area of each of the webbings, 140 and 140, is thereby dispersed. Incidentally, a further detailed construction of the retainer 123 will be described later.

As shown in FIGS. 3 and 4, the module cover 130 is constructed as a member for covering the airbag 121 of a housed condition by covering the opening part (airbag opening) of the retainer 123 from above, and includes at least a top panel portion 131 and a standing portion 132. The module cover 130 is typically molded by a metallic mold using a resin material.

The top panel portion 131 of the module cover 130 is constructed as a plate-shaped portion that limits an upper surface of the airbag apparatus 120 by approximately horizontally extending in a direction of an opening surface in an airbag opening area of the retainer 123. The standing portion 132 of the module cover 130 is constructed as a plate-shaped portion extending along the retainer wall portion 123c (a portion to be attached) of the retainer 123 in a vertical direction intersecting the extending surface of the top panel portion 131 from a lower surface (rear surface) of the top panel portion 131. The module cover 130 and the retainer 123 are connected by the standing portion 132 being attached and fixed to the retainer wall portion 123c via a clamp 120a, described later.

Further, as shown in FIG. 4, at a rear side of the motor vehicle (rider side) of the standing portion 132, a pair of left and right webbing penetrating-holes, 134 and 134, that allows an internal part of the module cover 130 to communicate with an external part of the module cover 130 is formed, and the webbing 140, described more in detail later, is enabled to extend over an area between the internal part of the cover of the module cover 130 and the external part of the cover of the same, via each of the webbing penetrating-holes, 134 and 134. The module cover 130 is configured such that the same is cleaved along a tear line 133, and tear lines 135 and 135, described later, formed at the standing portion 132, when the top panel portion 131 receives expanding and developing force from the airbag 121, at a time of the motor vehicle collision, and the module cover 130 is operated to release a covering condition of the opening portion (airbag opening) of the retainer 123. As a result, the expanding and developing motion of the airbag 121 is allowed. Incidentally, a further detailed construction of the module cover 130 will be described later.

In the present embodiment, the airbag 121 is configured to be tied with a vehicle body side of the two-wheeled motor vehicle 100 by a pair of left and right webbings, 140 and 140, which serves as elongated tying members. The webbings, 140 and 140, are constructed in a belt like shape by a similar webbing material (the material processed in a belt like shape using resin fiber thread) as a seatbelt for use in an automobile, for example, or a similar material as that of airbag fabric. Each of the webbings, 140 and 140, can also be constructed with a string like shape instead of the belt like shape. In each of the webbings, 140 and 140, one end portion 141 thereof is stitched on the airbag 121, and the other end portion 142 is connected to a clamp provided at the vehicle body side (a clamp 108 in FIGS. 1 and 2). That is, the webbings, 140 and 140, result in extending in a front and back direction in parallel with each other at two positions between the airbag apparatus 120 and the vehicle body. As shown in FIGS. 4 and 5, each of the webbings, 140 and 140, extends in a housing space between each of the webbing covers, 107 and 107, and the vehicle body constituting member 105 in a non-operating condition of the airbag apparatus 120, and an upper part of each of the webbings, 140 and 140, is covered with each of the webbing covers, 107 and 107.

Incidentally, since each of the webbings, 140 and 140, has an irregularly loose condition when the airbag 121 is housed, there is a possibility that the movement of each of the webbings, 140 and 140, whose condition is changed from the loose condition to the stretched condition along with the expanding and developing motion of the airbag 121 that is expanded and developed at the time of the forward collision of the motorcycle vehicle could lead to influence to a required expanding and developing motion of the airbag 121. Consequently, in the present embodiment, in each of the webbings, 140 and 140, a folding-over portion 143 is formed below each of the webbing covers, 107 and 107, so that looseness of each of the webbings, 140 and 140, before operation of the airbag apparatus 120 is started (when the airbag 121 is housed) is held in a predetermined bunched condition. In each of the folding-over portion 143, the loose portion of each of the webbings, 140 and 140, is folded over on itself (folded back) and a surface fastener 144 capable of temporarily holding the loose portion in a predetermined folding-over condition (predetermined bunched condition) is provided at an opposing surface formed in the loose portion.

The surface fastener 144 is a surface fastener having a known construction and is constructed as a detachable tape utilizing a pile structure, and sometimes also called "magic-type tape". In concrete terms, in the surface fastener 144, a shape of a small mushroom-type element (a hook-shaped hook in a case of a hook-type surface fastener) is disposed at one side face, and a shape of a loop is disposed at the other side face. When the two faces are attached together, the mushroom (or the hook) is hooked on the loop (tangled), and thereby easily attached thereto. On the contrary, when the two faces are detached, the mushroom (or the hook) is pulled out from the tangled condition by pulling each other, and thereby the same can be easily peeled off.

According to such a construction described above, the condition in which each of the folding-over portions, 143 and 143, is folded over on itself (bunched condition) at a time when the airbag 121 is housed is temporarily held via the surface fastener 144. On the other hand, when a predetermined stretching load is applied to each of the webbings, 140 and 140, at a time of expanding and developing motion of the airbag 121, holding force caused by the surface fastener 144 is released and the condition in which each of the folding-over portions, 143 and 143, is folded over on itself (bunched condition) is released.

Figure 6:
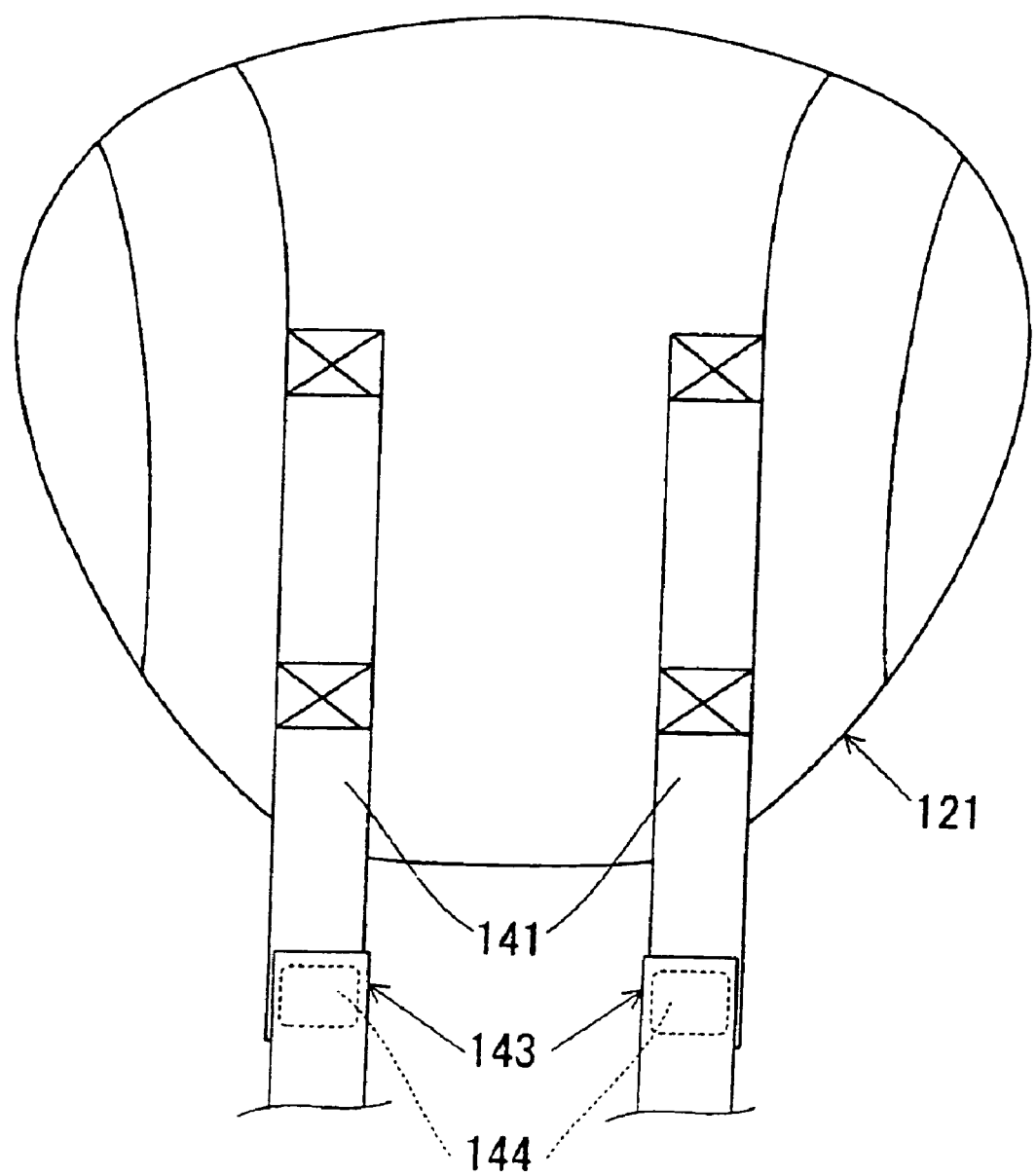
FIG. 6 is a view showing a construction of folded-over portions, 143 and 143, in webbings, 140 and 140, according to the present embodiment.

Further, a construction of the folding-over portions, 143 and 143, in each of the webbings, 140 and 140, in the present embodiment is shown in FIG. 6. As shown in FIG. 6, in the present embodiment, the folding-over portions, 143 and 143, are constructed in a manner so as to be disposed at approximately left and right symmetric positions. According to such a construction described above, the looseness of each of the webbings, 140 and 140, at a time when the airbag 121 is housed can be suppressed, and it becomes possible to make loads applied to the airbag 121 by each of the webbings, 140 and 140, which moves in an extending manner at the time of expanding and developing motion of the airbag 121, approximately equal at the left and right side. This construction is effective for the airbag 121 to be expanded and developed in an equal manner at the left and right side.

Incidentally, with respect to the holding structure of the webbings, 140 and 140, in the present embodiment, as long as the folding back condition of each of the folding-over portions, 143 and 143, can be temporarily held, a webbing holding device other than the surface fastener 144 can also be adopted. For example, the folding back condition of each of the folding-over portions, 143 and 143, may be temporarily held by, for example, a structure in which each of the folding-over portions, 143 and 143, is stitched by a tear seam, or a structure in which the folding-over portions, 143 and 143, is wound up by adhesive tape or the like. Further, at this moment, a construction in which the loose portion of each of the webbings, 140 and 140, is temporarily held via a webbing holding device in a predetermined folding over condition (predetermined folding back condition on itself), or a predetermined wound up condition, can be appropriately adopted.

Figure 7:
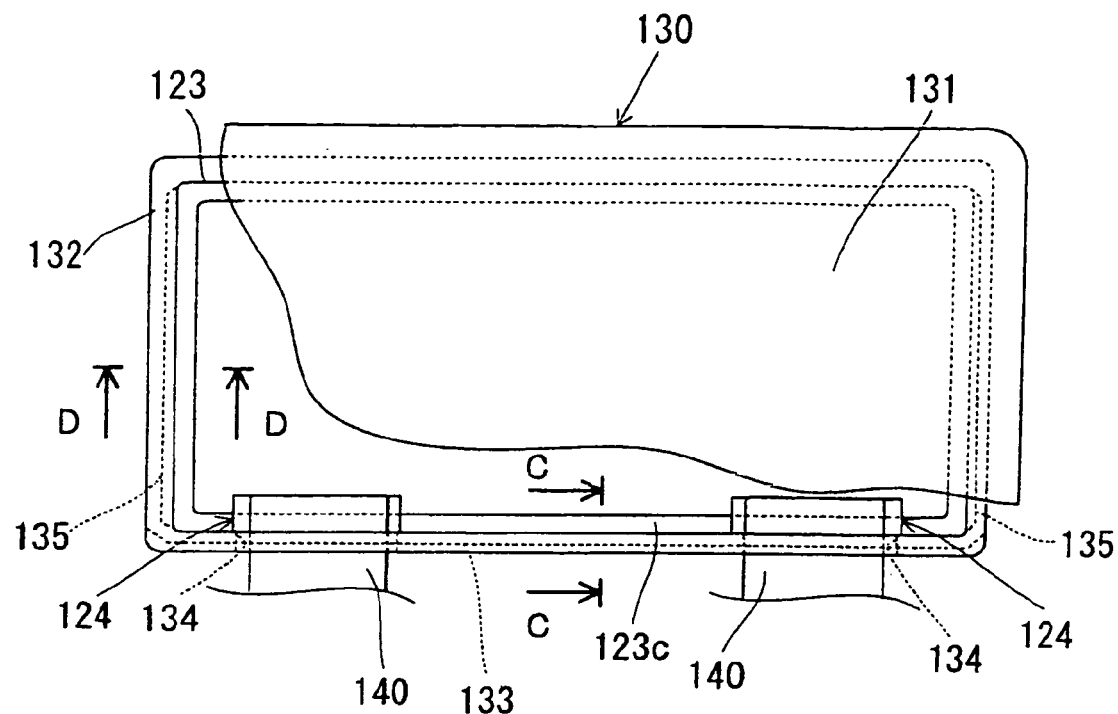
FIG. 7 is a view showing a condition of a module cover 130 and a retainer 123 according to the present embodiment, looking from above the motor vehicle.
Figure 8:
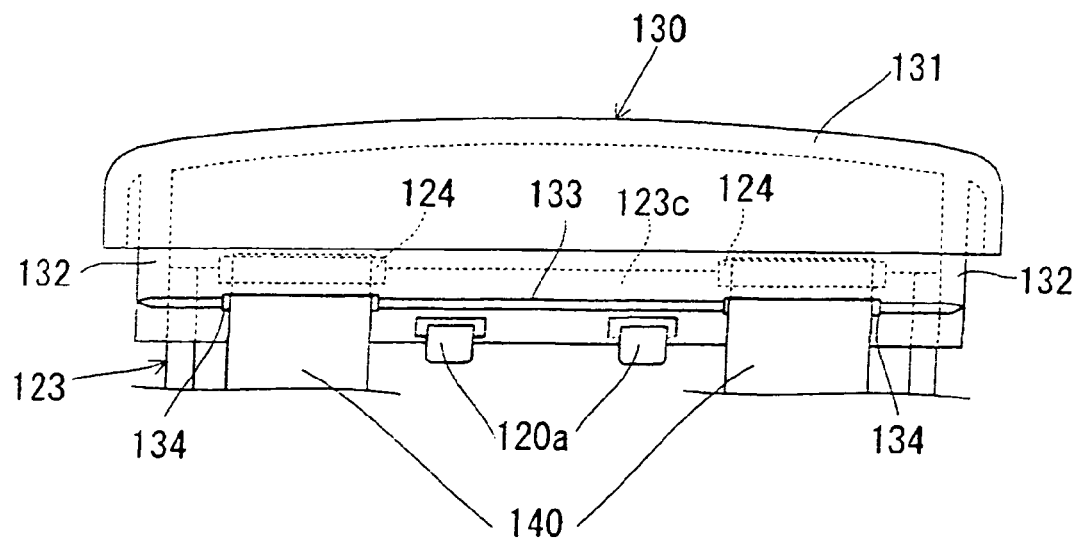
FIG. 8 is a view showing a condition of the module cover 130 and the retainer 123 according to the present embodiment, looking from behind the motor vehicle.
Figure 9:
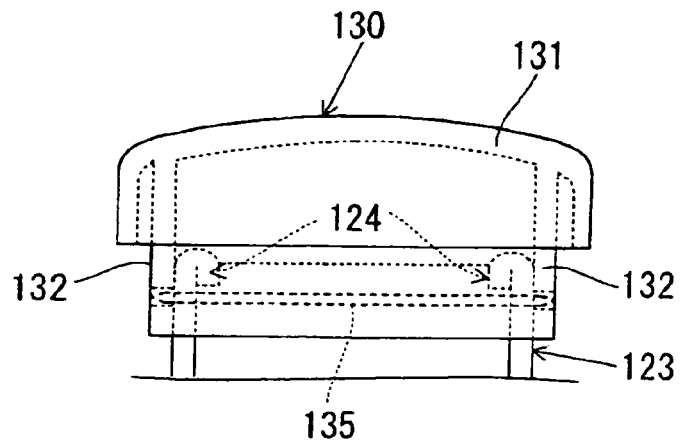
FIG. 9 is a view showing a condition of the module cover 130 and the retainer 123 according to the present embodiment, looking from a side of the motor vehicle.

At this moment, a further detailed construction of the module cover 130 having the above-described construction will be explained with referring to FIGS. 7 through 11. A condition in which the module cover 130 and the retainer 123 of the present embodiment is looked from above the motor vehicle is shown in FIG. 7, a condition in which the same is looked from behind the motor vehicle is shown in FIG. 8, and a condition in which the same is looked from the side of the motor vehicle is shown in FIG. 9. In addition, in FIG. 10, a structure at a cross-section along C-C line in FIG. 7 is shown, and a structure at a cross-section along D-D line in FIG. 7 is shown in FIG. 11.

As shown in FIGS. 7 through 9, in the standing portion 132 of the module cover 130 of the present embodiment, a tear line 133 is formed at an outer peripheral surface of a rear side (rider side) of the motor vehicle, and tear lines, 135 and 135, are formed at inner peripheral surfaces of both sides. In the present embodiment, since the tear line 133, and the tear lines, 135 and 135, are constructed to be provided not at the top panel portion 131 but at the standing portion 132, which is spaced apart from the top panel portion 131, there is no possibility that the load is directly applied to the tear line 133, or the tear lines, 135 and 135, even when a load of a rider, a baggage, or the like is applied from the above the module cover 130. As a result, it becomes possible to prevent the module cover 130 from being cleaved at the tear line 133, or the tear lines, 135 and 135, by the load. Incidentally, in the present embodiment, in addition to the standing portion 132 of the module cover 130, a construction in which a tear line is continuously formed from the standing portion 132 to other portions such as the top panel portion 131, can be also adopted.

Further, in the present embodiment, by providing the above-described webbing penetrating-holes, 134 and 134, on the tear line 133 of the standing portion 132, installing portions are shared resulting in aiming the rationalization. Each of the webbing penetrating-holes, 134 and 134, is constructed as a penetrating hole for the tying member provided in the standing portion 132 so that each of the webbings, 140 and 140, is enabled to be extended from inside the retainer 123 to the outside the module cover 130 passing above the retainer wall portion 123c (folding-back portion 124) (refer to FIGS. 4, 7, and 8).

In such a construction of the module cover 130 having the webbing penetrating-holes, 134 and 134, in the standing portion 132, liquid such as water or the like can enter an inside of the housing body from outside the module cover 130 via the webbing penetrating-holes, 134 and 134. Specifically, the motorcycle vehicle is generally constructed such that the airbag apparatus itself is exposed to outside the vehicle body differing from the case of the automobile, and therefore, there is a high possibility for the liquid such as water or the like to enter the housing body by influence of rain, car washing water, humidity, or the like. Consequently, the present embodiment has a characteristic part in a relative and positional relationship between the webbing penetrating-holes, 134 and 134, and the retainer wall portion 123c of the retainer 123. In concrete terms, the present embodiment is constructed in a step like manner such that an upper end of the retainer wall portion 123c at a side of the retainer 123 is situated nearer the upper part in relation to the webbing penetrating-holes, 134 and 134, at a side of the module cover 130 (More in concrete terms, refer to FIG. 4). According to such a construction described above, a flow path for the liquid such as water or the like that is caused to flow into the webbing penetrating-holes, 134 and 134, from outside the module cover 130 is blocked, and it becomes possible to dam up the liquid such as water or the like to further flow into a retainer 123 side by using the retainer wall portion 123c. That is, in the present embodiment, a blocking mechanism is provided in the retainer 123 itself. As a result, water or the like having a tendency to flow into the retainer 123 from outside the module cover 130 is prevented from entering.

Figure 10:
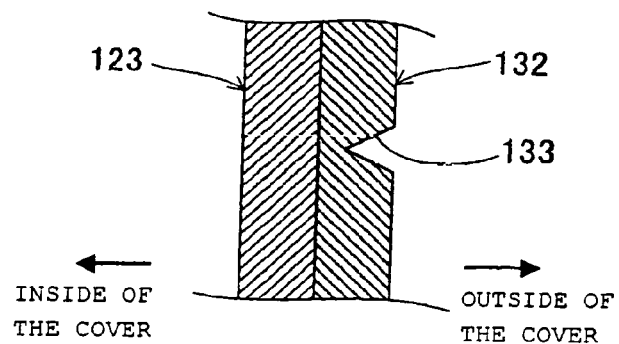
FIG. 10 is a view showing a cross-section structure along C-C cross-section in FIG. 7.
Figure 11:
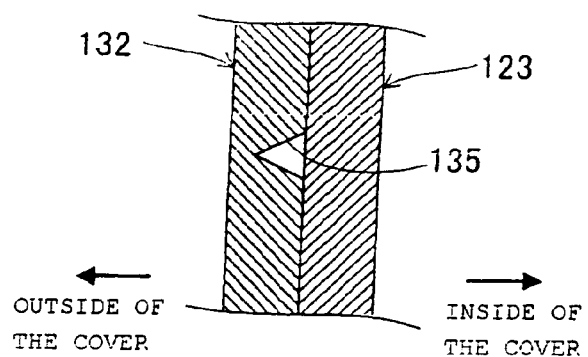
FIG. 11 is a view showing a cross-section structure along D-D cross-section in FIG. 7.

The tear line 133, and the tear lines, 135 and 135, are formed by providing a triangular notched portion on the standing portion 132, as shown in FIGS. 10 and 11. In accordance with such a construction of the tear line 133, and the tear lines, 135 and 135, a groove at a predetermined depth within a plate thickness of the standing portion 132, i.e., a reduced wall-thickness portion having approximately uniform plate thickness is continuously (consecutively) formed at three places at the rear side and both sides of the motor vehicle in the standing portion 132. Accordingly, the tear line 133, and the tear lines, 135 and 135, are sometimes also called "line-shaped groove", "reduced wall thickness portion", or "weak portion" in which a groove portion having a predetermined depth is formed in a line like shape. The thickness at a place where the tear line 133, and the tear lines, 135 and 135, are formed (thickness of the reduced wall portion) is appropriately set on the basis of a specification such as the expanding and developing force or the like of the airbag 121. Thereby, the module cover 130 is smoothly cleaved along the tear line 133, and the tear lines, 135 and 135, of the standing portion 132 by the expanding and developing force of the airbag 121 when the motor vehicle accident occurs, and a portion of the module cover 130 situated nearer the upside of the module cover 130 in relation to the tear lines is developed toward the front side of the motor vehicle by serving the front side of the motor vehicle in the standing portion 132 as a hinge. At this moment, a portion of the module cover 130 situated nearer the downside of the module cover 130 in relation to the tear line is constructed such that, a clamp 120a of the retainer 123 side is hooked and fixed on a penetrating hole of the standing portion 132 side, or is constructed to be riveted, and accordingly, the same can be securely held on the retainer 123 side even when the tear line is cleaved or the airbag is expanded and developed (refer to FIG. 8). With respect to a construction of the tear line, as described in the present embodiment, a construction in which a concave portion having a predetermined depth is continuously formed every constant intervals, a construction in which penetrating holes are continuously formed in a perforated line manner, a construction in which penetrating slits are continuously formed every constant intervals, or the like can also be adopted, instead of a construction in which a groove having a predetermined depth is continuously formed.

Incidentally, in the present embodiment, the notched portion for serving as the tear line 133, and the tear lines, 135 and 135, may be that formed by a metallic mold performed when the module cover is molded, or that formed by post process such as laser process, ultrasonic process, or the like performed after the module cover is molded. In addition, a cross-section shape of the tear line 133, and the tear lines, 135 and 135, may be a triangular shape, a half round shape, or the like, and is capable of appropriately changing when needed. Further, with regard to the place at which the tear line is formed, the tear line 133 may be formed at an inner peripheral surface at the rear side (rider side) of the motor vehicle of the standing portion 132, the tear lines, 135 and 135, may be formed at an outer peripheral surface at both sides of the standing portion 132.

Figure 12:
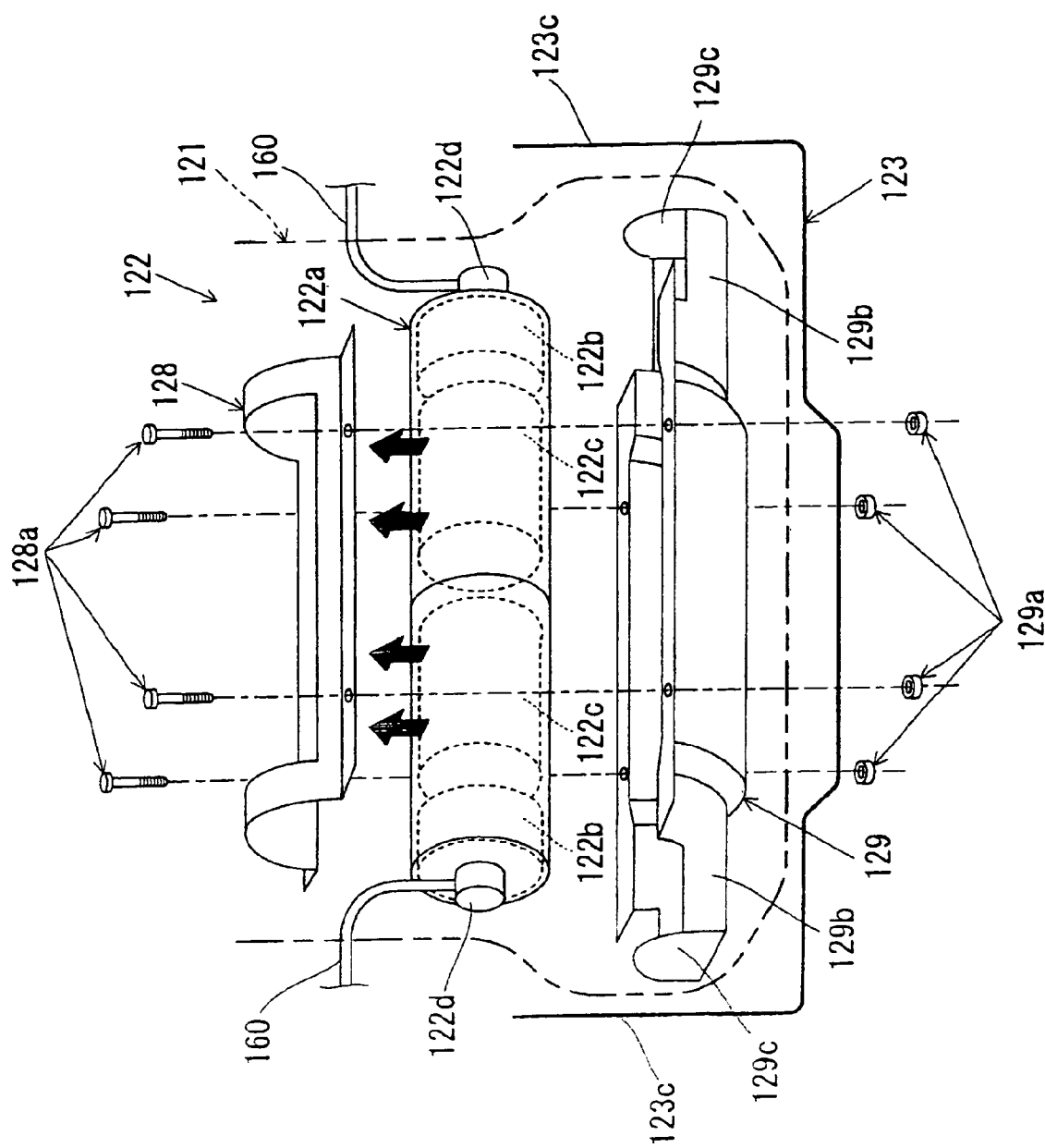
FIG. 12 is a view showing an attaching structure of a gas-generating device 122 to the retainer 123 according to the present embodiment.
Figure 13:
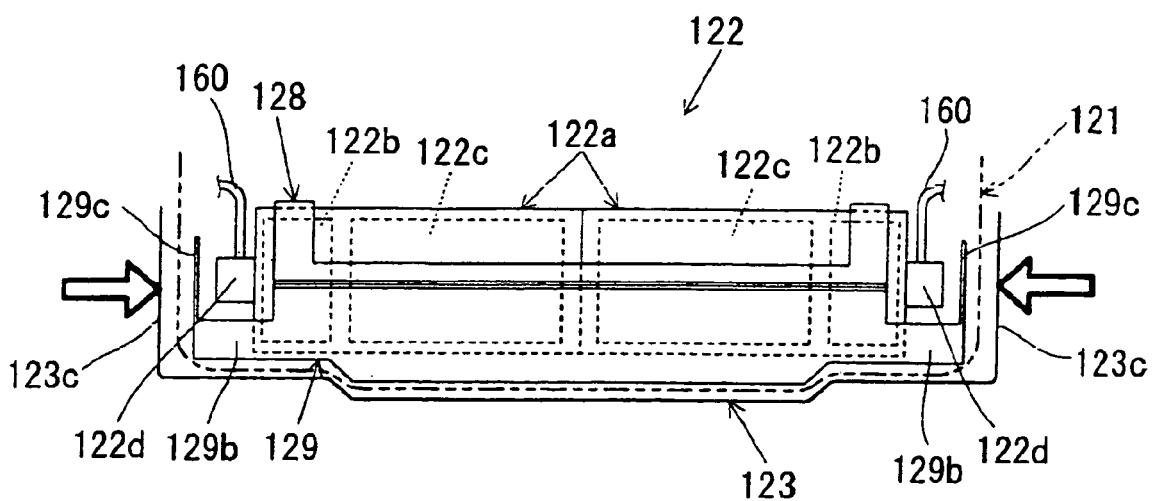
FIG. 13 is a view explaining a protecting function against external force from the retainer wall portion 123c with respect to a connector 122d in FIG. 12.
Figure 14:
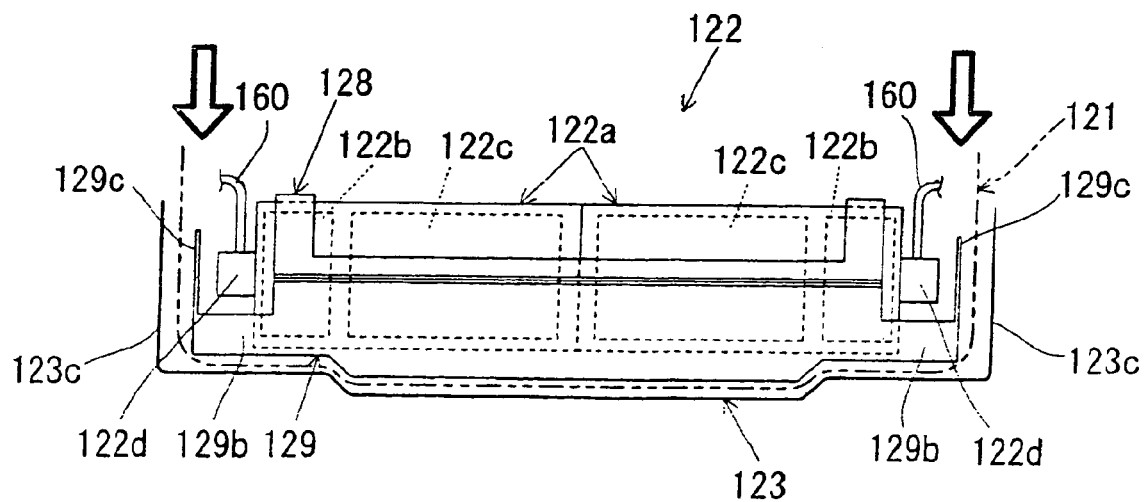
FIG. 14 is a view explaining a protecting function against the external force from an airbag 121 side with respect to the connector 122d in FIG. 12.

Next, a further detailed construction of the retainer 123 having the above-described construction will be explained with referring to FIGS. 12 through 17. At this moment, an attaching structure of the gas-generating device 122 to the retainer 123 of the present embodiment is shown in FIG. 12. Further, FIG. 13 is a view explaining a protecting function against external force from the retainer wall portion 123c with respect to a connector 122d in FIG. 12, and FIG. 14 is a view explaining the protecting function against the external force from the airbag 121 side.

As shown in FIG. 12, the gas-generating device 122 of the present embodiment is provided with a cylindrically shaped inflator 122a, a metal-made upper holder 128 for supporting the inflator 122a from an upper and lower direction, and a lower holder 129. The gas-generating device 122 is constructed to be attached to the retainer 123 in a condition of being housed in a lower part of the airbag 121. In concrete terms, the inflator 122a in a condition of being sandwiched between the upper holder 128 and the lower holder 129 from above and below is housed in a lower part of the airbag 121, and thereafter, the holding body is integrally attached and fixed to a bottom face of the retainer 123 by a bolt 128a and a nut 129a. The upper holder 128 and the lower holder 129 correspond to "inflator holder" in the present invention.

In addition, as shown in FIG. 12, the inflator 122a has a so-called two step-type structure in which an igniting section (igniter) 122b and a gas-generating section 122c are provided in a manner of a pair of the left and right. Each of the igniting sections 122b is connected to a harness 160 for supplying electric current via a connector 122d provided at an inflator side. When occurrence of the collision is detected by a detecting sensor (not shown) at a vehicle body side, at a time when the motor vehicle collision occurs, each of the igniting sections 122b is brought to an igniting condition by the electric current supplied via the harness 160. Propellant filled in each of the gas-generating section 122c is ignited and gas for expanding the airbag is generated by each of the igniting sections 122b being brought to the igniting condition simultaneously or with time lag, and thereby the gas for expanding the airbag is supplied to an inner part of the airbag 121. The inflator 122a corresponds to "inflator" in the present invention, and the igniting section 122b, the gas-generating section 122c, and the harness 160 respectively correspond to "igniting section", "gas-generating section", and "harness", and the connector 122d corresponds to "connector" in the present invention.

Specifically, the gas-generating device 122 of the present embodiment is characterized in a construction of the lower holder 129. The lower holder 129 is constructed with metal-made horizontal extending portions, 129b and 129b, extending in a horizontal manner from a center portion of a holder main body to both sides in left and right directions, and metal-made vertical extending portions, 129c and 129c, extending in a vertical manner from the horizontal extending portions, 129b and 129b, to a position situated nearer the upside in relation to the connector 122d. Each horizontal extending portion 129b is provided with a function to support each vertical extending portion 129c. Each vertical extending portion 129c is a metal-made plate-shaped piece intervening in a space between each connector 122d and the retainer wall portion 123c, and is provided with a function for avoiding the retainer wall portion 123c and the connector 122d to interfere (contact) with each other by defilading outer periphery side of each connector 122d. The vertical extending portion 129c constructs "interference-avoiding device" and "intervening portion" in the present invention. Further, in each portion in the retainer 123, the connector 122d and the opposing retainer wall portion 123c correspond to "opposing portion of the housing body" in the present invention.

In such a construction of the lower holder 129, in a case that external force in left and right directions indicated by white outline arrows in FIG. 13 is applied from the retainer wall portion 123c to the connector 122d, the external force is received by the vertical extending portion 129c. That is, in a case that the retainer wall portion 123c and the connector 122d come close to each other, the vertical extending portion 129c serves as an intervening object between the retainer wall portion 123c and the connector 122d. As a result, the retainer wall portion 123c is prevented from directly interfering with the connector 122d, and it becomes possible to be configured such that the external force is not applied to the connector 122d, or that influence of the external force to the connector 122d is suppressed. Specifically, since the horizontal extending portion 129b that supports the vertical extending portion 129c is extending in the left and right directions along an applying direction of the external force, the receiving capability against the external force can be increased.

Incidentally, as a case in which the external force in the left and right directions is applied to the connector 122d, a time of assembling work for attaching and fixing the inflator 122a sandwiched between the upper holder 128 and the lower holder 129 from above and below, as described above, to the bottom face of the retainer 123 by bolts 128a and nuts 129a, in a condition of being housed at a lower portion of the airbag 121, or a housed condition in which the inflator 122a is housed in the retainer 123, or the like case is assumed. Specifically, at the time of assembling work for attaching and fixing the inflator 122a to the bottom face of the retainer 123, it is not possible to check with eyes whether the external force is actually applied to the connector 122d from the retainer wall portion 123c, or the like, since the connector 122d is housed in the airbag 121 and is thereby blocked out by the airbag 121. Consequently, as described in the present embodiment, it becomes possible to aim at securely protecting the connector 122d without giving anxious thought to the worker who attaches and fixes the inflator 122a by previously providing the vertical extending portion 129c in the lower holder 129.

Further, in the aforementioned construction of the lower holder 129, in a case that downward-looking external force (load) indicated by white outline arrows in FIG. 14 is applied from above the connector 122d to the connector 122d, the external force is received by an upper end portion of the vertical extending portion 129c. As a case that the downward-looking external force is applied to the connector 122d, a time when the airbag 121 is folded back, or a time when the airbag 121 is pressed into the retainer 123 so as to house the airbag 121 in an upper area of the inflator 122a in each area in the retainer 123, in a predetermined folding back condition, are assumed.

Consequently, the present embodiment is configured such that the upper end portion of each vertical extending portion 129c is extended to a position situated nearer the upper part in relation to the connector 122d, and the plate thickness of the flat plate-shaped vertical extending portion 129c is increased, and resultant strength capable of opposing the downward external force from the airbag 121 is applied to the vertical extending portion 129c. The strength of the vertical extending portion 129c may be aimed at increasing by changing the shape of the vertical extending portion 129c to, for example, a curved shape, instead of increasing the plate thickness of the flat plate-shaped vertical extending portion 129c. As a result, deformation of the vertical extending portion 129c caused by the downward-looking external force from the airbag 121 is suppressed. This construction corresponds to the construction in the present invention described as the extending portion of the inflator holder prevents the connector from receiving the downward-looking load from the airbag, which is caused along with the housing operation for the airbag. In accordance with such a construction as that described above, it becomes possible to prevent the external force from being applied to the connector 122d at a time of housing operation for the airbag 121, by receiving the downward-looking external force from the airbag 121 by the upper end portion of the vertical extending portion 129c.

Figure 15:
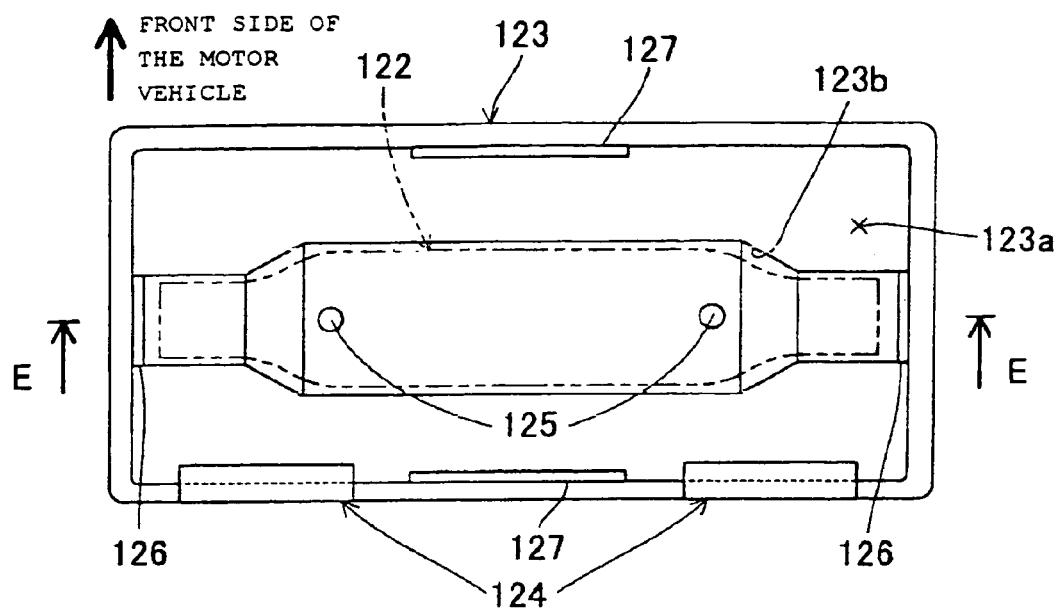
FIG. 15 is a view showing a condition of the retainer 123 according to the present embodiment, looking from above the motor vehicle.
Figure 16:
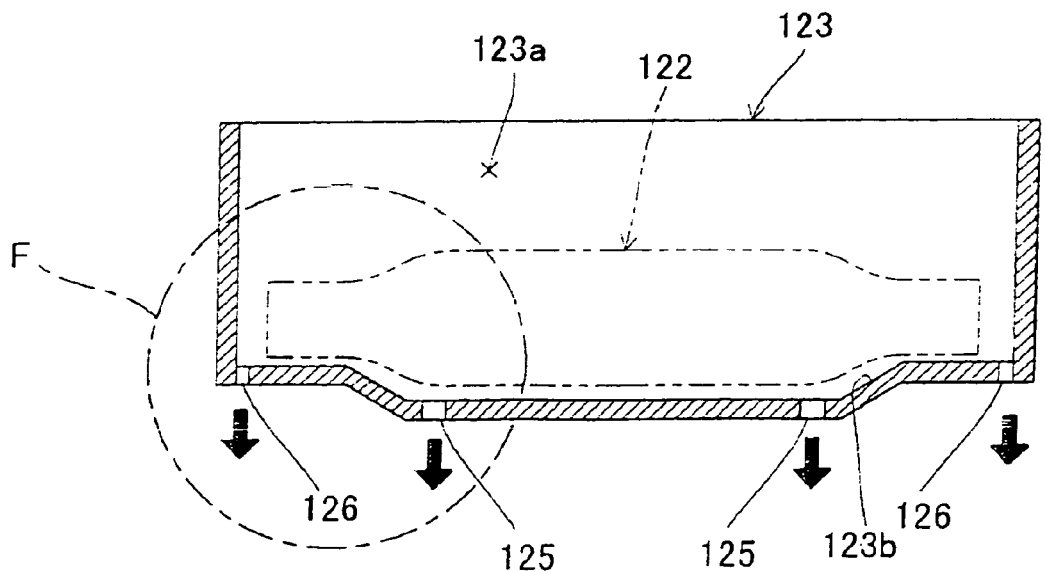
FIG. 16 is a view showing a cross-section structure along E-E cross-section in FIG. 15.
Figure 17:
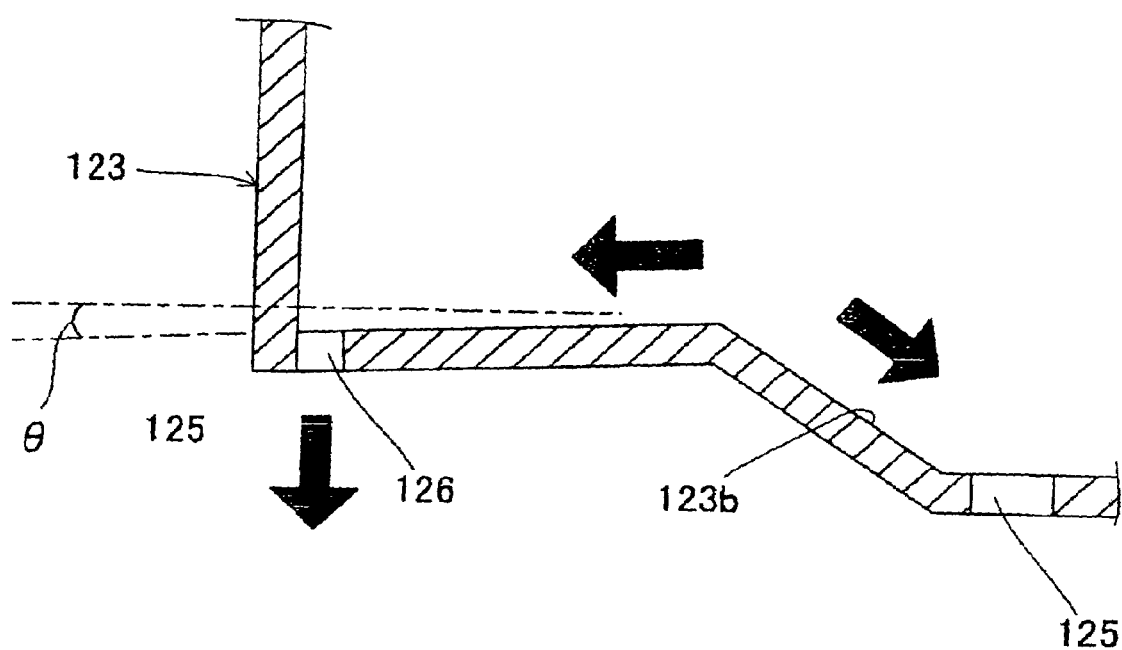
FIG. 17 is an enlarged view of a portion F in FIG. 16.

Further, a condition in which the retainer 123 of the present embodiment is looked from above the motor vehicle is shown in FIG. 15. Furthermore, a structure at a cross-section along E-E line in FIG. 15 is shown in FIG. 16. In FIG. 17, an enlarged view of a part F in FIG. 16 is shown.

As shown in FIGS. 15 and 16, at the bottom face (bottom portion area) of the retainer 123 of the present embodiment, a pair of hole-shaped first penetrating portions, 125 and 125, is provided in the inflator housing portion 123b, and a pair of slit-shaped second penetrating portions, 126 and 126, is provided at left and right end portions. Further, a pair of slit-shaped third penetrating portions, 127 and 127, is provided at front and rear end portions. Any of the first penetrating portions, 125 and 125, the second penetrating portions, 126 and 126, and the third penetrating portions, 127 and 127, is a penetrating part extending in a vertical direction (perpendicular direction) in the bottom portion area of the retainer 123, and is provided with a water discharging function for discharging water that has entered in the retainer 123 to the outside of the retainer 123. As a result, the water that has entered in the retainer 123 is discharged to the outside of the retainer 123 through the first penetrating portions, 125 and 125, the second penetrating portions, 126 and 126, and the third penetrating portions, 127 and 127 in a continuous manner or an intermittent manner by the action of gravity.

At this moment, a housing body such as the retainer 123 in the present embodiment has a structure of a box shape having a bottom, in which an airbag opening is provided at an upper part thereof. Therefore, liquid having fluidity, such as water, oil, or the like, enters into an inner part of the housing body through a peripheral part of the airbag opening, even though sealing characteristic is improved, and the liquid tends to be accumulated. Specifically, the motorcycle vehicle is generally constructed such that the airbag apparatus itself is exposed to outside the vehicle body differing from the case of the automobile, and therefore, such a problem becomes specifically noticeable by influence of rain, car washing water, humidity, or the like. Consequently, the present embodiment is constructed such that, the first penetrating portions, 125 and 125, the second penetrating portions, 126 and 126, and the third penetrating portions, 127 and 127, for discharging water, are provided at a bottom face of the retainer 123. Further, it is natural to say that the liquid having fluidity, such as oil or the like, other than the water, which has entered into the inner part of the retainer 123 can also be discharged outside of the retainer 123, through the first penetrating portions, 125 and 125, the second penetrating portions, 126 and 126, and the third penetrating portions, 127 and 127. As a construction of the penetrating portion for the discharging function, various kinds of opening forms, such as a hole, a slit, a mesh, a punching plate, or the like can be adopted. In the present embodiment, the setting place of the penetrating portion for discharging water, the number of the setting places thereof can be appropriately changed according to the needs.

The setting places of the first penetrating portions, 125 and 125, are corresponding to the concave shaped inflator housing portion 123b, and are configured to be the lowest place in each portion of the bottom face of the retainer 123. That is, the bottom portion area of the retainer 123 is constructed to have a portion that is formed into a down slope (curved slope) toward the first penetrating portions, 125 and 125. As a result, the water that has entered into inside of the retainer 123 is collected into the first penetrating portions, 125 and 125, along the slope of the inflator housing portion 123b, and is securely discharged outside of the retainer 123 through the first penetrating portions, 125 and 125.

On the other hand, the second penetrating portions, 126 and 126, have a function for securely discharging the water outside of the retainer 123. Specifically, the water that has entered into inside of the retainer 123 and accumulated in the left or the right end portions thereof is securely discharged outside of the retainer, in a case that the two-wheeled motor vehicle 100 is parked in a laterally inclined manner using a kickstand, or a case that the vehicle body is laterally inclined while running. Further, in the vicinity of the second penetrating portions, 126 and 126, the bottom face of the retainer 123 has a down slope structure in which the height of the bottom face is configured such that the closer the position on the bottom face approaches the second penetrating portions, 126 and 126, the lower the position on the bottom face becomes (slope angle θ), as shown in FIG. 17. That is, the bottom portion area of the retainer 123 is constructed to have a portion configured to be a down slope (straight line like slope) toward the second penetrating portions, 126 and 126. As a result, not only in a case that the vehicle body is in an inclined condition, but also in a case that the vehicle body is even in a horizontal condition, the water that has entered into inside of the retainer 123 is collected to the side of the second penetrating portions, 126 and 126, by the sloping structure of the bottom face of the retainer 123, and is securely discharged outside of the retainer 123 through the second penetrating portions, 126 and 126. Specifically, since the second penetrating portions, 126 and 126, are provided at both the left and right end portions of the retainer 123, each of the second penetrating portions, 126 and 126 tends to be the lowest place of a bottom portion of the retainer 123, when the motorcycle vehicle is inclined into the right side or the left side. This results in high water discharging capability. As a case that the motorcycle vehicle is inclined into the right side or the left side, a case that the motorcycle vehicle is parked in a manner so as to be inclined into the right side or the left side, or a case that the motorcycle vehicle is inclined into the right side or the left side while traveling along a right-hand curve, or a left-hand curve, or the like is quoted. The slope angle θ of the bottom face of the retainer 123 can be appropriately set on the basis of the specification of the retainer 123, or the like.

Furthermore, the third penetrating portions, 127 and 127, specifically have a function of discharging water that has entered into inside of the retainer 123 and accumulated in front and rear end portions. For example, when the two-wheeled motor vehicle 100 travels on a road surface of an uphill slope or a down slope, the two-wheeled motor vehicle 100 inclines by the front portion of the motor vehicle becoming lower than the rear portion of the motor vehicle, or the two-wheeled motor vehicle 100 inclines by the front portion of the motor vehicle becoming higher than the rear portion of the motor vehicle. In the present embodiment, and in such a case, the third penetrating portion 127 at a front side, or that at a rear side tends to be the lowest place in the bottom portion of the retainer 123 and the water in the retainer 123 is securely discharged outside of the retainer 123 through the third penetrating portion 127. Incidentally, as a case that the motor vehicle inclines in the front and rear direction, a case that the retainer 123 itself is assembled in an inclining manner relative to the motor vehicle, or the like, other than the case that the motor vehicle travels on a road surface of the uphill slope or the down slope, is quoted.

Incidentally, as for a water discharging structure of the present embodiment, when a surface tension of water is considered, it is preferable to secure the hole diameter of the first penetrating portions, 125 and 125, to be 7 mm or more (cross-section area is 38 mm2 or more), and further, it is preferable to set such that a cross-section area of the second penetrating portions, 126 and 126, and that of the third penetrating portions, 127 and 127, are configured to be the same cross-section area as that of the first penetrating portions, 125 and 125, or that a slit width of the second penetrating portions, 126 and 126, and that of the third penetrating portions, 127 and 127 are set to be the same as the hole diameter of the first penetrating portions, 125 and 125.

Figure 18:
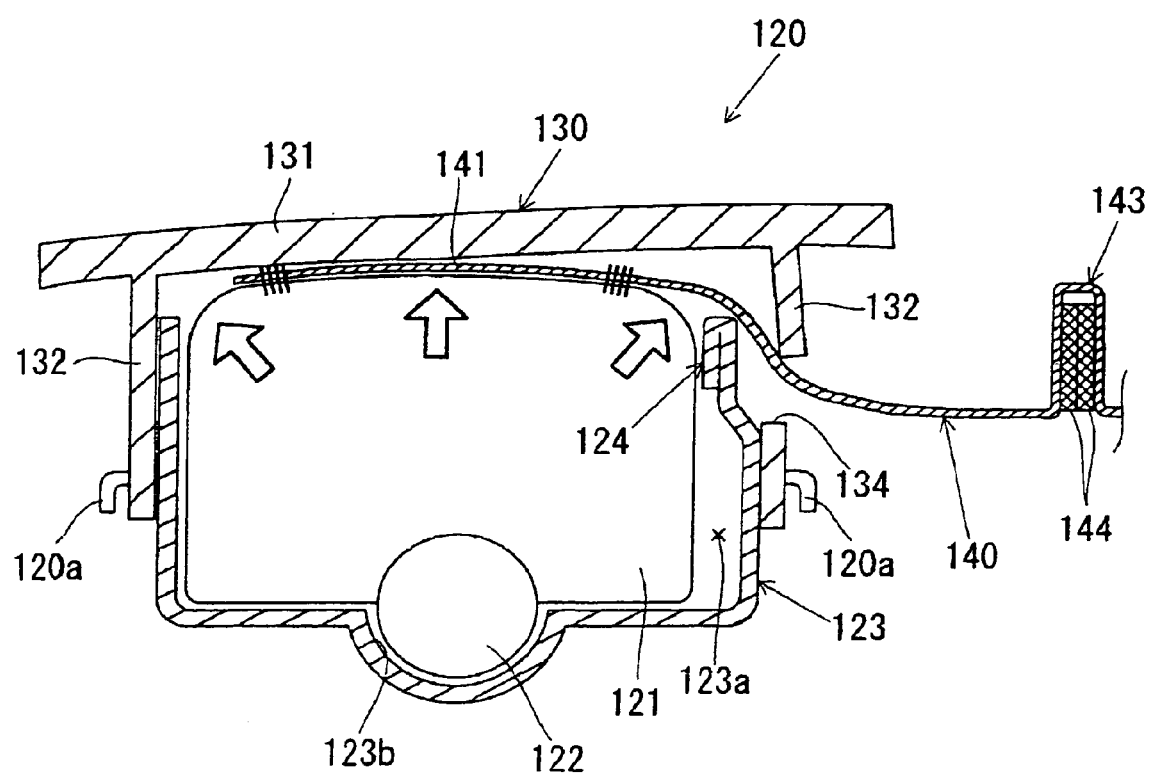
FIG. 18 is a view showing a condition in an initial stage of an expanding and developing motion of the airbag 121 in the airbag apparatus 120 according to the present embodiment.
Figure 19:
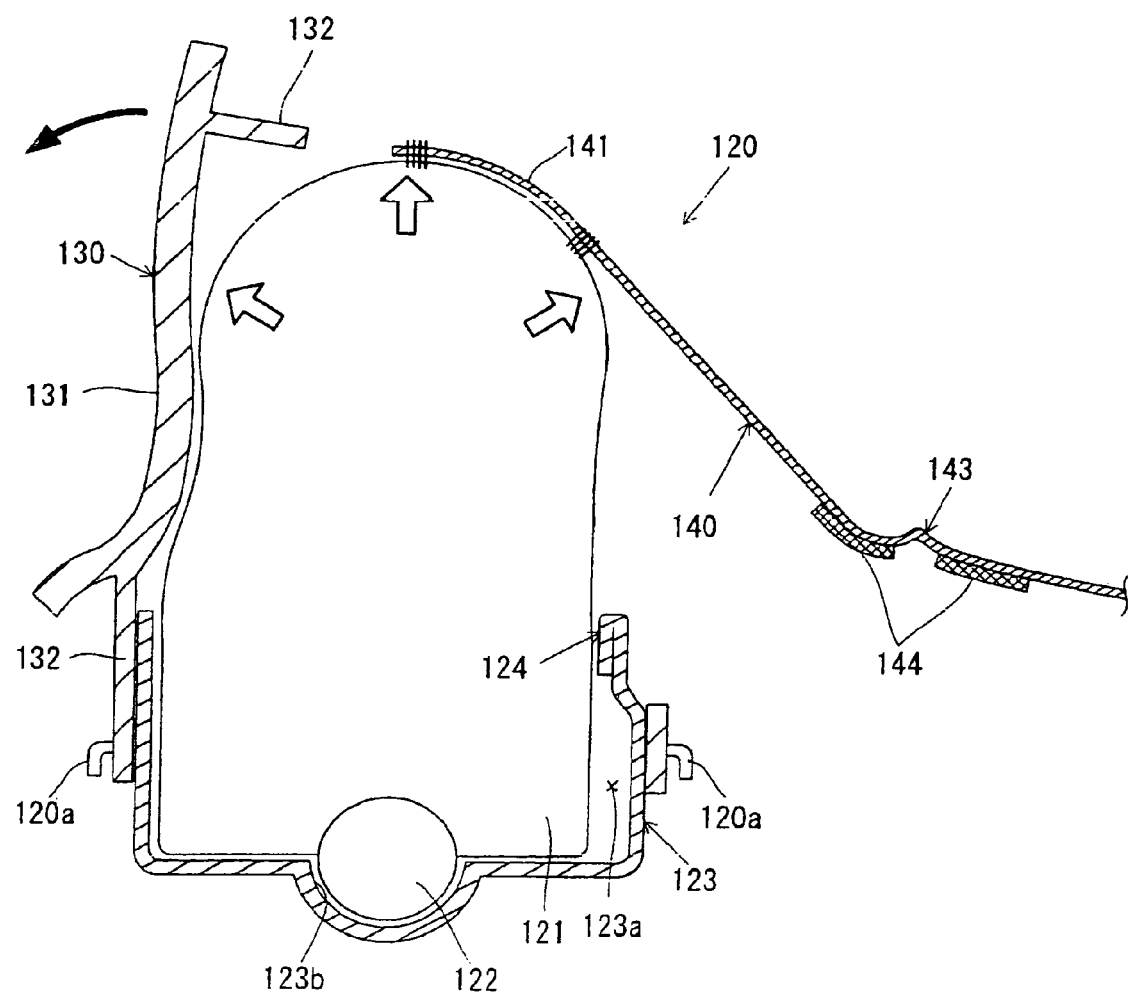
FIG. 19 is a view showing a condition in the middle of the expanding and developing motion of the airbag 121 in the airbag apparatus 120 according to the present embodiment.
Figure 20:
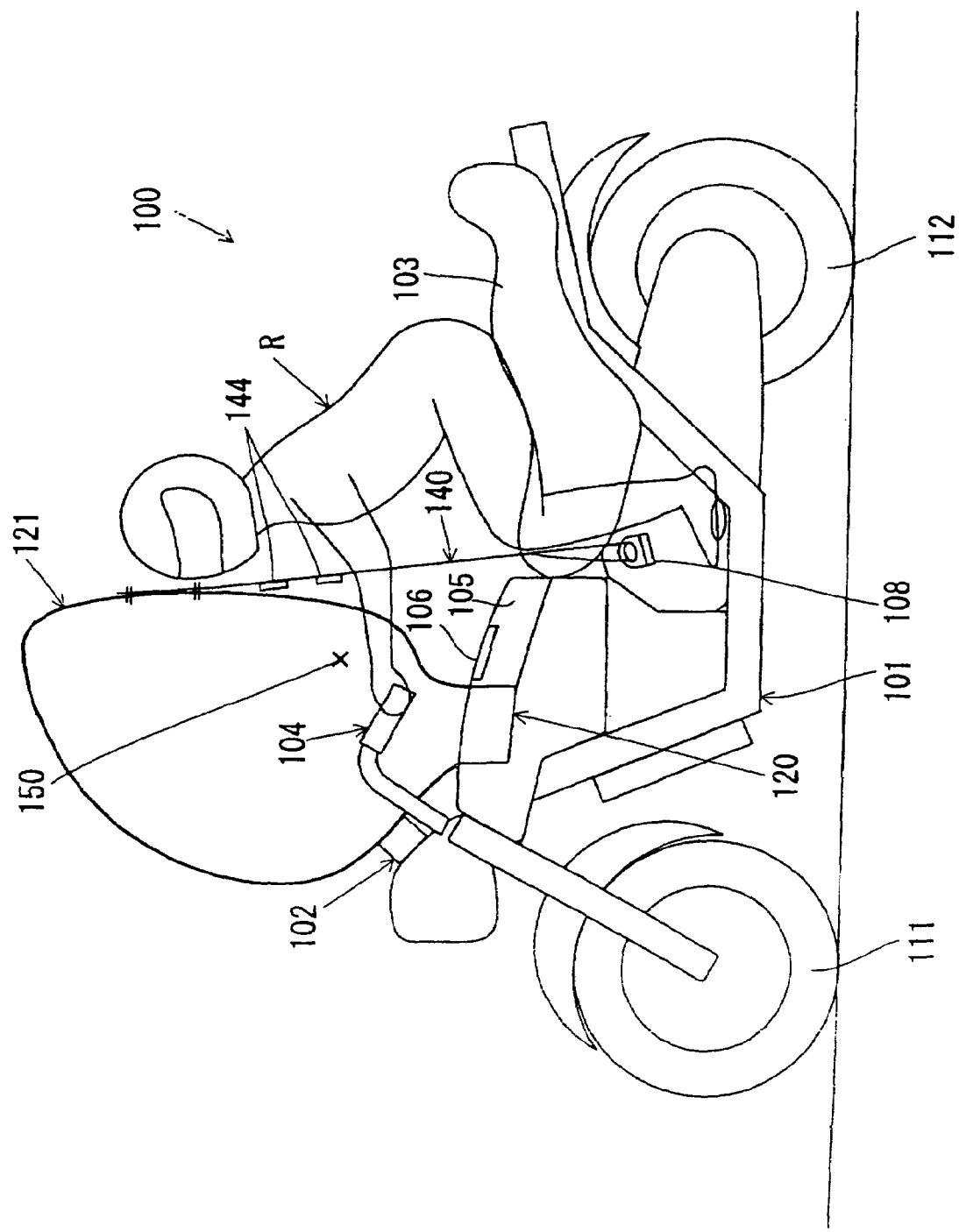
FIG. 20 is a view showing a condition on completion of the expanding and developing motion of the airbag 121 in the airbag apparatus 120 according to the present embodiment, and the condition on completion of the expanding and developing motion of the airbag 121 is looked from the side of the motor vehicle.
Figure 21:
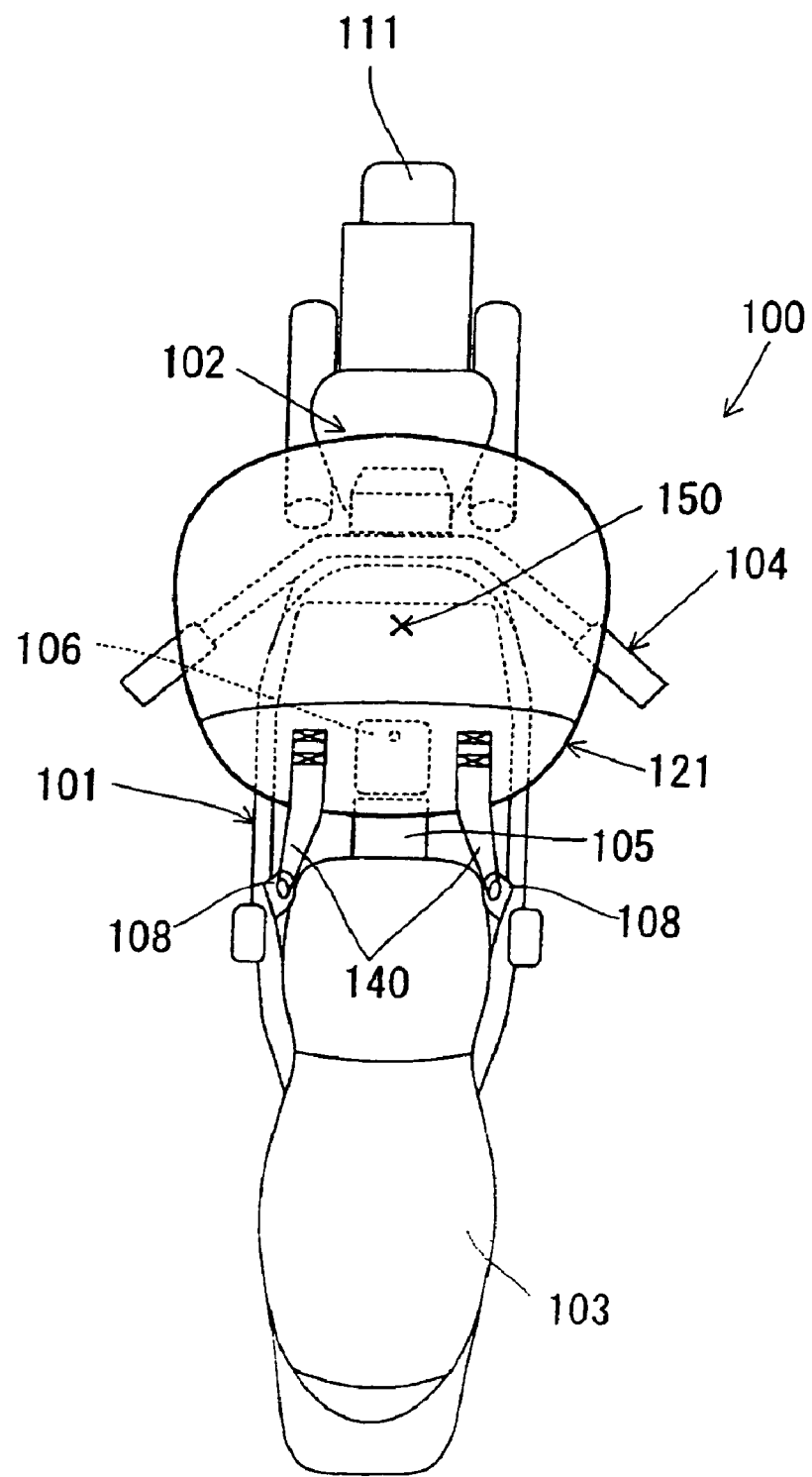
FIG. 21 is a view showing a condition on completion of the expanding and developing motion of the airbag 121 in the airbag apparatus 120 according to the present embodiment, and the condition on completion of the expanding and developing motion of the airbag 121 is looked from above the motor vehicle.

Next, an operating condition of the airbag apparatus 120 having the aforementioned construction will be explained referring to FIGS. 18 through 21 or the like. At this moment, a condition of an initial stage of the expanding and developing motion of the airbag 121 in the airbag apparatus 120 of the present embodiment is shown in FIG. 18, a condition in the middle of the expanding and developing motion of the airbag 121 is shown in FIG. 19, and a condition on completion of the expanding and developing motion of the airbag 121 is shown in FIGS. 20 and 21. Specifically, FIG. 20 is a view of the condition on completion of the expanding and developing motion of the airbag 121, looking from a side of the motor vehicle, and FIG. 21 is a view of the condition on completion of the expanding and developing motion of the airbag 121, looking from above the motor vehicle.

When the two-wheeled motor vehicle 100 encounters a collision at a side of direction of progress, the rider moves toward a front side of the two-wheeled motor vehicle 100 and is about to be given a fling. In the present embodiment, the gas-generating device 122 of the airbag apparatus 120 is activated by detection for the front side collision, and the gas for expanding the airbag generated in the gas-generating device 122 is started to be supplied into the airbag 121. As a result, in the airbag apparatus 120 in FIG. 3 that is in a condition before operation, a protruding (developing) operation of the airbag 121 toward a direction indicated by an arrow 10 is started. Further, the gas for expanding the airbag is continuously sent into the airbag 121, and thereby an expanding portion is being formed in series from the retainer 123 side to the airbag 121.

At this moment, as shown in FIG. 18, in the condition of the initial stage of the expanding and developing motion of the airbag 121, the airbag 121 in the expanding and developing process presses the top panel portion 131 of the module cover 130 from a lower surface, in the retainer 123. As a result, the module cover 130 that receives the expanding and developing force of predetermined value or more from the airbag 121 is cleaved along the tear lines (the tear line 133, and the tear lines, 135 and 135, in FIG. 7) formed in the standing portion 132. Further, by a start of the expanding and developing motion of the airbag 121, action of a stretching load for each webbing 140 stitched on the airbag 121 starts through one end portion 141 thereof. As a result, each webbing 140 pushes open the webbing cover 107 upward and thereby the covered condition formed by the webbing cover 107 is released.

Furthermore, as shown in FIG. 19, in the condition in the middle of the expanding and developing motion of the airbag 121, the module cover 130, which is cleaved along the tear lines further receives the expanding and developing force from the airbag 121, thus causing the front side of the motor vehicle around the standing portion 132 to develop toward the front side of the motor vehicle by serving as a hinge. At this moment, when a further stretching load is applied to each webbing 140 through the one end portion 141, the holding force caused by the surface fastener 144 is released, and the condition in which each of the folding-over portions, 143 and 143, is folded back on itself is released. At this moment, in the present embodiment, since the folding-over portions, 143 and 143, of the webbings, 140 and 140, are disposed at approximately left and right symmetric positions, it becomes possible to expand and develop the airbag 121 in an equal manner at the left and right side by making the load applied to the airbag 121 by each webbing 140, which moves in an extending manner at the time of expanding and developing motion of the airbag 121, approximately equal at the left and right side.

Thus, as shown in FIGS. 20 and 21, the airbag 121 is formed to have a completely expanded and developed condition. In this condition, the expanded airbag 121 brims over the rider-restraining area 150 that is formed in front of a rider R in FIG. 20. As a result, the rider R that is about to move in a front side moving direction by energy of movement caused at a time of the motor vehicle collision is restrained by the expanded airbag 121, and the shock applied to the rider R in restraining is tempered.

Further, each webbing 140 is formed of an extended condition extending in approximately straight line like manner between the airbag 121 and the clamp 108, and limits the motion of the airbag 121 directed toward an area above the motor vehicle or the front side of the motor vehicle by tension force of each webbing 140. Furthermore, the airbag 121 whose expanding and developing motion is completed is constructed such that a side of the front side of the motor vehicle is in contact with a front portion 102, and both sides thereof are in contact with the handle 104. As a result, it becomes possible to aim at stabilizing the restraining operation for the rider R by the airbag 121 whose expanding and developing motion is completed.

As described above, according to the present embodiment, specifically, the vertical extending portion 129c of the lower holder 129 is caused to intervene at a space between the retainer wall portion 123c and the connector 122d, and thereby the retainer wall portion 123c can be prevented from directly interfering with the connector 122d. As a result, it becomes possible to suppress the external force received by the connector 122d from the retainer wall portion 123c. At this moment, in the present embodiment, since the vertical extending portion 129c that serves as an interference-avoiding device is formed using the lower holder 129 provided so as to integrally hold the inflator 122a in the retainer 123, it becomes possible to easily and rationally construct the interference-avoiding device. As a result, although the airbag apparatus 120 of the present embodiment is constructed such that the inflator 122a and the connector 122d are attached and fixed to the internal part of the retainer 123 in a condition of being housed in the airbag 121, and is constructed such that whether the external force is actually applied to the connector 122d from the retainer 123, or the like, cannot be checked with eyes because of being blocked out by the airbag 121, it is specifically effective to aim at securely protecting the connector 122d without giving anxious thought to the worker who attaches and fixes the inflator 122a.

Further, according to the present embodiment, since the vertical extending portion 129c of the lower holder 129 can receive a downward-looking load applied from the airbag 121 side, by the strength of the vertical extending portion 129c itself, it becomes possible to prevent the load to be applied to the connector 122d. Thus, the vertical extending portion 129c of the lower holder 129 used as the interference-avoiding device can also be further used as a device for preventing the connector 122d from receiving the downward-looking force from the airbag 121. Therefore, a further rational structure can be realized.

Incidentally, the present invention is not limited to only the above-described embodiment, and various applications and variations may be considered. For example, each of following embodiments, in which the above-described embodiments are applied, can be also carried out.

In the aforementioned embodiment, although a case in which interference of the retainer wall portion 123c and the connector 122d with each other is avoided by intervening the vertical extending portion 129c of the lower holder 129 in the space between the retainer wall portion 123c and the connector 122d is described, other construction can also be adopted with respect to the interference-avoiding device in the present invention. For example, an aspect in which a resin-made or a rubber-made cushioning material (elastic material) is intervened in a space instead of the metal-made vertical extending portion 129c, another aspect in which a cushioning material (elastic material) is joined at the retainer wall portion 123c, or the connector 122d, still another aspect in which a cushioning material (elastic material) is joined at a connector 122d side of the vertical extending portion 129c intervening in a space, or the like may also be adopted. In this case, it may be constructed such that the external force applied to the connector 122d from the retainer wall portion 123c is completely blocked by the interference-avoiding device, or that the external force in a reduced condition may be applied to the connector 122d. Incidentally, in each aspect, the interference-avoiding device such as the vertical extending portion 129c may be formed using an existing component, such as the lower holder 129, or may be provided as a component for exclusive use for avoiding the interference.

Further, in the aforementioned embodiments, although a case, in which the external force from the airbag 121 is prevented from being applied to the connector 122d by increasing the strength of the vertical extending portion 129c positioned nearer the upside in relation to the connector 122d, when the downward-looking external force is applied to the vertical extending portion 129c of the lower holder 129, is described, other construction can be adopted in the present invention.

For example, a construction in which the vertical extending portion 129c itself is prevented from interfering with the connector 122d by the vertical extending portion 129c being deformed in a direction for being spaced apart from the connector 122d, can also be adopted. In accordance with the construction, the vertical extending portion 129c itself is brought to be able to be prevented from interfering with the connector 122d. Further, a construction, in which a space defining the above of the connector 122d is formed by the vertical extending portion 129c being in contact with a member other than the connector 122d at the side of the inflator 122a, or the like construction may be used, while the vertical extending portion 129c is deformed in a direction for approaching the connector 122d. According to the construction described above, it becomes possible that the vertical extending portion 129c itself is prevented from interfering with the connector 122d, and in addition, a member other than the vertical extending portion 129c is prevented from interfering with the connector 122d as well.

Furthermore, in the aforementioned embodiment, although a construction in which the inflator 122a and the connector 122d are housed in the airbag 121 is described, the interference-avoiding structure between a connector and a member at a housing body side, which is the characteristic part of the present invention, can be adopted in a construction in which the inflator 122a and the connector 122d are disposed outside of the airbag 121.

Moreover, although the aforementioned embodiment is described with respect to the so-called touring-type two-wheeled motor vehicle 100, the present invention can be applied to motorcycles of other kind, such as a scooter-type, in which a space allowing a lateral movement of a leg portion of a rider is included between a handle and a seat, and further, to motorcycle vehicles other than the two-wheeled motor vehicle 100.

Further, although the aforementioned embodiment is described with respect to a case in which the airbag apparatus 120 is disposed in front of the fuel tank 106, as long as the airbag 121 can be expanded and developed in a required area at a time of motor vehicle collision, the position for disposing the airbag apparatus 120 can be appropriately changed. The airbag apparatus 120 can be appropriately disposed at a position nearer the rear side or the down side in relation to the position shown in FIG. 1, for example.

What is claimed is:

1. A gas generation unit for a motorcycle airbag, the gas generation unit comprising:
   an inflator for supplying inflation gas;
   a harness on an end of the inflator to supply electric current to the inflator;
   a connector mounted on the end of the inflator to connect the harness to the inflator;
   an elongated housing for the inflator, the housing including a lower base portion to support the inflator thereon;
   a horizontal extension at an end of the base portion corresponding to the end of the inflator with the connector, the horizontal extension sized to extend beyond an end of the connector; and
   a blocking device extending transversely from the horizontal extension to shield the connector from the airbag.

2. The gas generation unit of claim 1 wherein the blocking device is integral with the lower base portion of the housing.

3. The gas generation unit of claim 1 wherein an upper edge of the blocking device extends above the connector to provide shielding for the connector from side impacts therewith.

4. The gas generation unit of claim 3 wherein the upper edge of the blocking device provides shielding for the connector from impacts with the connector from thereabove.

5. The gas generation unit of claim 3 wherein the blocking device is spaced from the connector to allow for clearance between the connector and the blocking device when the blocking device is deformed due to a force exerted thereon.

6. The gas generation unit of claim 1 wherein the inflator includes an igniting section connected to the harness and a gas generating section connected to the igniting section, with the gas generating section providing gas to inflate the airbag upon detection of a collision.

7. The gas generation unit of claim 1 including a second connector on an opposite end of the inflator, a second horizontal extension and a second blocking device associated with the second connector having the same configuration as the first horizontal extension and first blocking device.

8. The gas generation unit of claim 1 wherein the housing includes an upper portion mounted to the lower base portion to secure the inflator in the housing.

9. The gas generation unit of claim 8 wherein the inflator is cylindrically-shaped and the lower and upper portions of the housing each have a semi-cylindrical shape to accommodate the cylindrically-shaped inflator.

10. The gas generation unit of claim 1 wherein the blocking device is oriented to be substantially parallel relative to a flat outer face of the connector.

11. An airbag apparatus to be mounted to a motorcycle, the airbag apparatus comprising:
    an airbag;
    a retainer for housing the airbag;
    an inflator in the airbag for supplying inflation gas thereto;
    side wall portions of the retainer extending adjacent either end of the inflator;

a harness to supply electric current to the inflator;

a connector mounted on at least one of the ends of the inflator for connecting the harness thereto;

a housing in the airbag for the inflator extending longitudinally between the side wall portions of the retainer; and a blocking device of the housing positioned between the connector and the adjacent retainer side wall portion to shield the connector from engaging the retainer side wall portion.

12. The airbag apparatus of claim 11 wherein the housing includes a base portion and an upper portion, and the blocking device is integral with the base portion of the housing.

13. The airbag apparatus of claim 12 wherein the base portion of the housing includes a horizontal extension at an end of the base portion corresponding to the end of the inflator with the connector, the horizontal extension sized to extend beyond the end of the connector.

14. The airbag apparatus of claim 13 wherein the blocking device extends transversely from the horizontal extension.

15. The airbag apparatus of claim 14 including a second connector on an opposite end of the inflator, a second horizontal extension and a second blocking device associated with the second connector having the same configuration as the first horizontal extension and first blocking device associated with the first connector.

16. The airbag apparatus of claim 11 wherein the blocking device extends upwardly beyond the connector to keep the airbag from falling into engagement therewith.

17. The airbag apparatus of claim 16 wherein the blocking device is a plate having a curved upper edge.

18. A motorcycle comprising:

a body;

a seat of the body for supporting a rider seated thereon;

a retainer mounted forwardly of the seat;

an airbag housed in the retainer;

a cylindrical inflator in the airbag for supplying inflation gas to the airbag, the inflator having opposing ends;

side wall portions of the retainer extending adjacent either end of the inflator;

a connector mounted on each end of the inflator;

a blocking device in the airbag for each end of the inflator, the blocking device positioned between each connector and the corresponding adjacent side wall portion to shield the connector from engaging the retainer side wall portion.

19. The motorcycle of claim 18 wherein the inflator is secured in a housing mounted to a base portion of the retainer and the blocking device is integral with the housing.

* * * * *